US012663532B1

(12) United States Patent
Bertken

(10) Patent No.: US 12,663,532 B1
(45) Date of Patent: Jun. 23, 2026

(54) LINKABLE LIGHTING APPLICATIONS

(71) Applicant: Infinity X1 LLC, Carlsbad, CA (US)

(72) Inventor: Dennis K. Bertken, Carlsbad, CA (US)

(73) Assignee: Infinity X1 LLC, Carlsbad, CA (US)

( * ) Notice: Subject to any disclaimer, the term of this patent is extended or adjusted under 35 U.S.C. 154(b) by 0 days.

(21) Appl. No.: 19/291,983

(22) Filed: Aug. 6, 2025

(51) Int. Cl.
| | |
|---|---|
| *G01S 13/58* | (2006.01) |
| *G01J 1/42* | (2006.01) |
| *H04W 8/00* | (2009.01) |
| *H04W 52/02* | (2009.01) |
| *H05B 47/11* | (2020.01) |
| *H05B 47/115* | (2020.01) |

(52) U.S. Cl.
CPC ........... *G01S 13/583* (2013.01); *G01J 1/4204* (2013.01); *H04W 8/005* (2013.01); *H04W 52/0254* (2013.01); *H05B 47/11* (2020.01); *H05B 47/115* (2020.01)

(58) Field of Classification Search
CPC .......... G01S 13/04; G01S 13/06; G01S 13/56; H05B 47/115; H05B 47/11; G01J 1/4204; H04W 8/005; H04W 52/0254
See application file for complete search history.

(56) References Cited

U.S. PATENT DOCUMENTS

| | | | | | |
|---|---|---|---|---|---|
| 6,403,942 | B1 * | 6/2002 | Stam | ...................... | B60Q 1/085 |
| | | | | | 250/214 AL |
| 9,013,331 | B2 * | 4/2015 | Wise | ...................... | F21S 8/032 |
| | | | | | 340/961 |
| 9,801,258 | B2 * | 10/2017 | Broers | ................. | H05B 47/175 |
| 10,098,212 | B2 * | 10/2018 | Vendetti | .................. | H04W 4/38 |
| 10,344,927 | B1 * | 7/2019 | Wright | .................. | H05B 47/19 |
| 10,383,196 | B1 * | 8/2019 | Barnes | ................. | H05B 47/115 |
| 12,048,301 | B2 * | 7/2024 | Wenger | .................. | G06F 18/24 |
| 2011/0282468 | A1 * | 11/2011 | Ashdown | ............... | H05B 47/19 |
| | | | | | 700/90 |
| 2012/0038281 | A1 * | 2/2012 | Verfuerth | ............... | H05B 41/36 |
| | | | | | 315/152 |
| 2012/0153868 | A1 * | 6/2012 | Gu | ........................ | H05B 47/115 |
| | | | | | 315/307 |
| 2012/0206051 | A1 * | 8/2012 | Nieuwlands | ......... | H05B 47/115 |
| | | | | | 315/153 |
| 2012/0217880 | A1 * | 8/2012 | Nieuwlands | ........... | H05B 45/10 |
| | | | | | 315/153 |

(Continued)

*Primary Examiner* — Peter M Bythrow
(74) *Attorney, Agent, or Firm* — Wang Hardoon, P.C.

(57) ABSTRACT

A microwave motion detection system and lighting applications. Certain types of lighting devices turn on/off and may respond to certain triggers (e.g., motion-activation, dusk-to-dawn, etc.), etc. Such lighting devices may be battery powered and have minimal on-board circuitry. Coordinating these lighting devices together to provide zoned lighting functionality has not been commercially successful. Various aspects of the present disclosure are directed to "smart enough" lighting solutions. Smart enough lighting solutions may include link-based connectivity that enables coordination between peer lighting devices. The decentralized system may enable groups of smart enough lighting devices to communicate salient events (triggering conditions and operational parameters) across a mesh network, without centralized coordination. For example, each of the smart enough lighting devices may use point-to-point communication protocols to directly communicate with its peer devices, relaying information throughout the group.

17 Claims, 11 Drawing Sheets

(56) References Cited

U.S. PATENT DOCUMENTS

| | | | | |
|---|---|---|---|---|
| 2016/0174333 A1* | 6/2016 | Kim | ..................... | G01J 1/4204 |
| | | | | 250/338.1 |
| 2018/0027631 A1* | 1/2018 | Turvy, Jr. | ........... | H05B 47/1965 |
| | | | | 315/307 |
| 2019/0008019 A1* | 1/2019 | Le Hénaff | ............ | H05B 47/175 |
| 2019/0150251 A1* | 5/2019 | Yang | ..................... | H05B 45/12 |
| | | | | 315/152 |
| 2019/0191529 A1* | 6/2019 | Magielse | ............. | H05B 47/155 |
| 2020/0229285 A1* | 7/2020 | Pandharipande | .... | H05B 47/115 |
| 2021/0041523 A1* | 2/2021 | Murthy | ................... | G01S 7/417 |
| 2021/0289603 A1* | 9/2021 | Siegel | ................... | G06V 20/52 |
| 2022/0417714 A1* | 12/2022 | Maes | ................... | G08B 29/16 |
| 2022/0418073 A1* | 12/2022 | Graff | ..................... | H05B 47/19 |
| 2024/0036189 A1* | 2/2024 | Krajnc | ................... | G01S 13/04 |
| 2024/0085546 A1* | 3/2024 | Krajnc | ................... | G01S 7/006 |
| 2024/0260157 A1* | 8/2024 | Thangavelu | ......... | H05B 47/115 |
| 2024/0280683 A1* | 8/2024 | Stevens | .................. | G01S 7/006 |
| 2024/0324088 A1* | 9/2024 | Mouilleseaux | ........ | H05B 45/20 |
| 2025/0071872 A1* | 2/2025 | Borra | ..................... | G01S 13/88 |
| 2025/0189631 A1* | 6/2025 | Ghadiali | ............... | G05D 25/02 |
| 2025/0203737 A1* | 6/2025 | Elcock | .................. | G06V 20/52 |

* cited by examiner

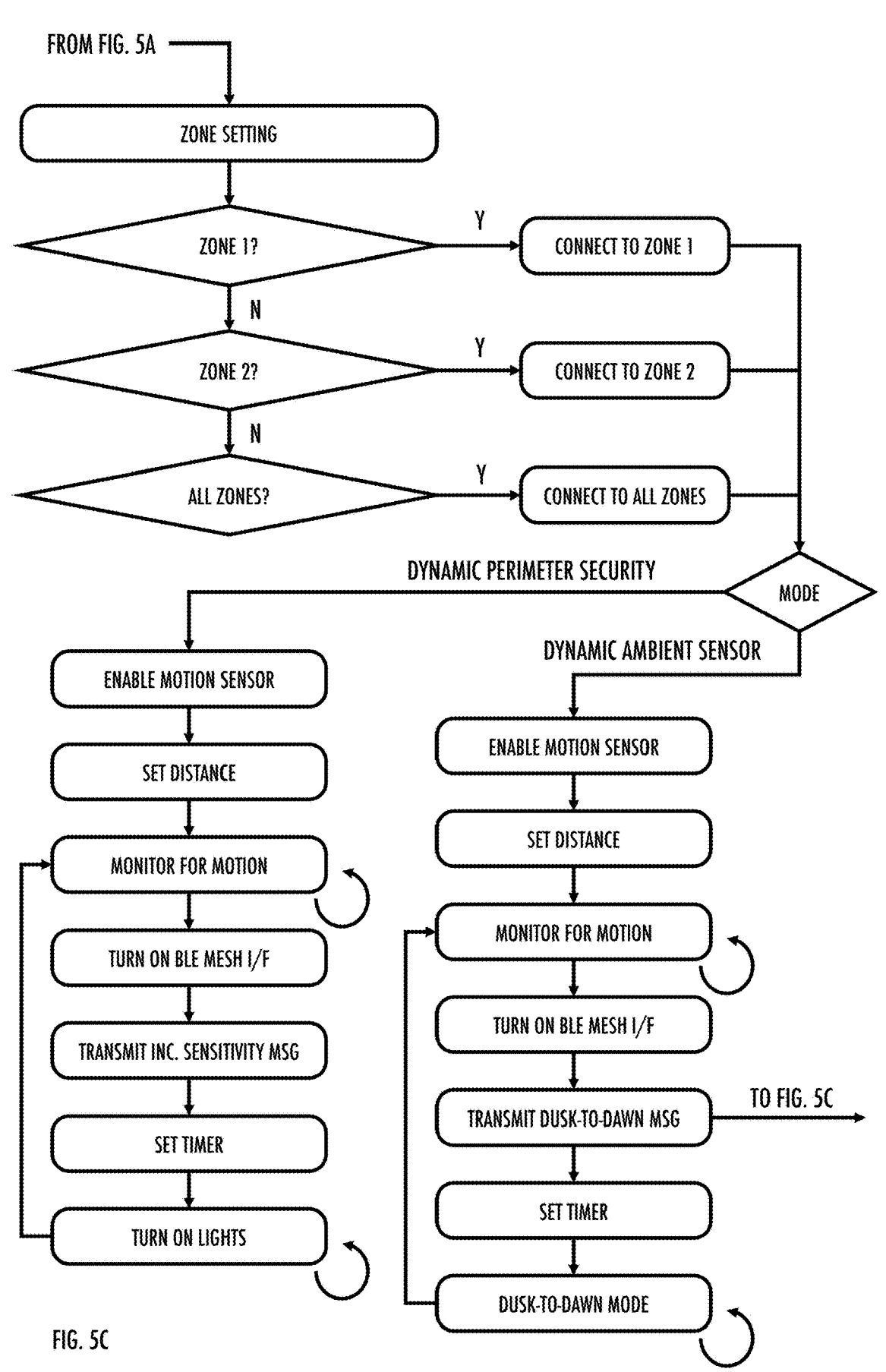

FROM FIG. 5A

ZONE SETTING

ZONE 1? — Y → CONNECT TO ZONE 1

N

ZONE 2? — Y → CONNECT TO ZONE 2

N

ALL ZONES? — Y → CONNECT TO ALL ZONES

MODE

DYNAMIC PERIMETER SECURITY

DYNAMIC AMBIENT SENSOR

ENABLE MOTION SENSOR

SET DISTANCE

MONITOR FOR MOTION

TURN ON BLE MESH I/F

TRANSMIT INC. SENSITIVITY MSG

SET TIMER

TURN ON LIGHTS

ENABLE MOTION SENSOR

SET DISTANCE

MONITOR FOR MOTION

TURN ON BLE MESH I/F

TRANSMIT DUSK-TO-DAWN MSG — TO FIG. 5C

SET TIMER

DUSK-TO-DAWN MODE

FIG. 5C

LINKABLE LIGHTING APPLICATIONS

COPYRIGHT

TECHNICAL FIELD

This disclosure relates generally to the field of lighting appliances. More particularly, the present disclosure relates to linked lighting behavior.

DESCRIPTION OF RELATED TECHNOLOGY

Motion detection-based lighting systems typically use motion sensors to detect the presence or movement of people or objects in a specific area. When motion is detected, the lighting system is activated, turning on the lights. Motion detection lighting is commonly used for outdoor security lighting, as well as for indoor applications in spaces like hallways, bathrooms, and closets. It enhances safety, reduces energy consumption, and adds a layer of convenience by automatically illuminating spaces when used.

BRIEF DESCRIPTION OF THE DRAWINGS

FIGS. 5A-5C present a logical flow diagram for linkable lighting devices, in accordance with various aspects of the present disclosure.

DETAILED DESCRIPTION

Figure 1A:
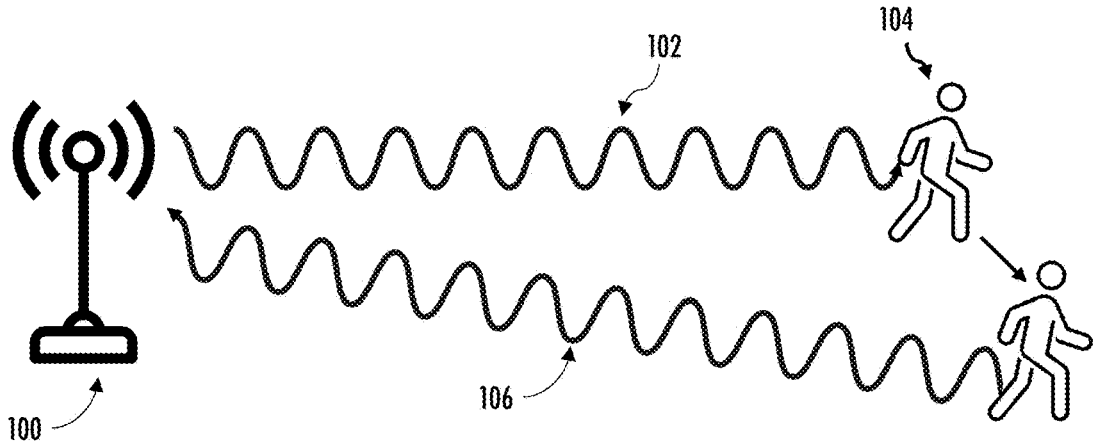
FIGS. 1A-1C illustrate operation of a microwave motion detector.

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

For purposes of the description hereinafter, it is to be understood that the specific articles, compositions, and/or processes described herein are exemplary and should not be considered as limiting. In the description, relative terms such as "lower," "upper," "horizontal," "vertical,", "above," "below," "up," "down," "top," "bottom," "underside," "front," "rear," and "side" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

1 Microwave Motion Detection and Cordless Lighting

Microwaves are a form of electromagnetic radiation with wavelengths ranging from 1 millimeter to 1 meter. Microwaves possess the ability to penetrate certain materials based on their frequency characteristics. When microwaves encounter a wall, they may reflect off its surface, be absorbed by the material, or pass through it. The extent of penetration depends on factors such as the frequency of the microwaves, the thickness and density of the wall, and the specific composition of the materials involved. Metal, being a strong absorber and reflector of microwaves, can significantly impede penetration. However, microwaves can pass through common building materials such as drywall, wood, glass, and certain types of concrete.

A microwave motion detector includes a transmitter that emits microwave signals and a receiver that captures the reflected signals. The transmitter includes an oscillator circuit that produces a stable and continuous oscillating waveform generating a signal at the desired microwave frequency. The transmitter transmits a continuous-wave (CW) signal, typically in the GHz frequency range. Nearby objects reflect part of that signal, which is received by the receiver. A mixer receives the signal sent by the transmitter and the reflected signal received by the receiver. The mixer outputs the difference between the transmitted and received signals, so static objects generate a zero-frequency signal while objects that are moving (and therefore reflecting a doppler-shifted signal) generate a signal whose frequency is proportional to the speed of the object.

Conventional microwave motion detection operates by emitting continuous microwave signals into the monitored area and analyzing the reflections caused by moving objects. The motion detection sensor contains a transmitter that emits microwave signals, typically in the gigahertz (e.g., 10.525 GHZ) range, and a receiver that captures the reflected signals. When there is no motion, the emitted and received signals match, indicating a static environment. However, when an object enters the monitored zone and disrupts the microwave pattern, the sensor detects a Doppler shift in the reflected signals due to the object's movement. The Doppler shift is caused by the change in frequency as the object approaches or moves away from the sensor. The sensor's electronics analyze these frequency changes to determine the speed, direction, and presence of motion.

FIG. 1A illustrates continuous operation of a microwave motion detector 100. Here, the transmitter of the microwave motion detector 100 emits the microwave signal 102 continuously (without idling), and the receiver of the microwave motion detector 100 continuously (without idling) detects for a signal. The microwave motion detector 100 can calculate information about an object, including person 104, based on the doppler-shifted signal 106 reflected off the object. The information about the object may include the presence of motion, the velocity of the object, the size object size, etc.

Historically, microwave motion detection systems have had greater power requirements compared to other motion sensing technologies (such as passive infrared (PIR), etc.). The continuous operation of the microwave transmitter and receiver components, as well as the signal processing electronics, demands a relatively higher power consumption. The microwave sensor has needed to emit a constant stream of microwave signals and continually analyze the reflections to detect any changes indicative of motion. As a result, in applications where energy efficiency is a priority or in situations where power availability is limited, such as in battery-operated devices or off-grid installations, the use of microwave motion detection has been limited.

U.S. patent application Ser. No. 18/765,295, filed Jul. 7, 2024, and entitled "MICROWAVE MOTION DETECTION SYSTEM AND LIGHTING APPLICATIONS", incorporated by reference in its entirety, discloses time slicing and/or pulse width modulation (PWM) modifications to microwave signals to reduce power consumption, etc.

Figure 1B:
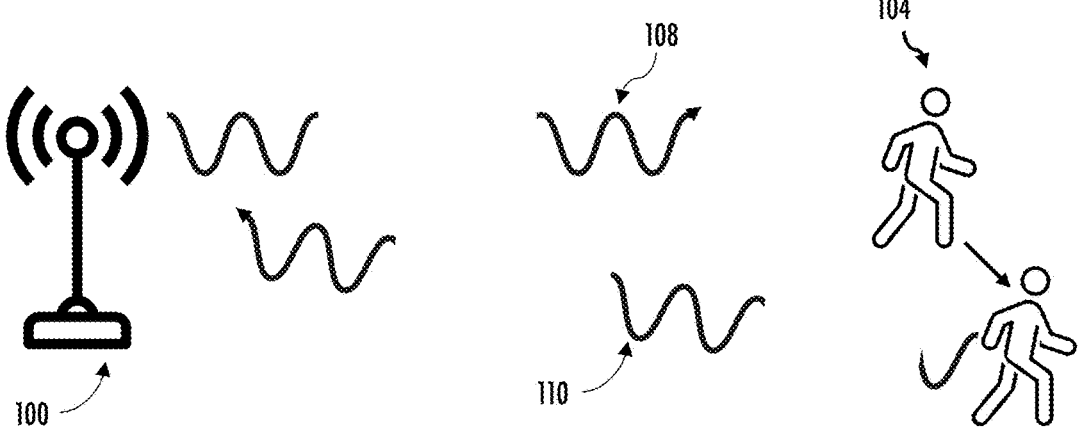

FIG. 1B illustrates discontinuous operation of a microwave motion detector 100. Here, the microwave motion detector 100 may discontinuously transmit/receive the microwave signal in time slices. Time slicing may allow the microwave motion detector 100 to conserve energy without providing a noticeable disruption in operation. In such examples, the transmitter and/or receiver in the microwave motion detector 100 are active for a particular duration (transmitting and then idling or receiving and then idling) rather than operating continuously. The operation of the transmitter and/or receiver of the microwave motion detector 100 may be according to a given duty cycle.

As shown, the transmitter of the microwave motion detector 100 emits the microwave signal 108 according to a selected duty cycle. In some examples, the receiver of the microwave motion detector 100 may periodically idle based on the duty cycle of the transmitter. In other examples, the receiver operates continuously while the transmitter operates according to a duty cycle. The microwave motion detector 100 can calculate information about an object, including person 104, based on the doppler-shifted signal 110 reflected off the object.

As used herein, "duty cycle" describes a fraction of time during which a component is periodically in an active state compared to a total period. For example, an 80% duty cycle (sometimes also referred to as an 80/20 duty cycle) refers to a component that is on/active for 80% of the cycle (and off/idle for 20% of the duty cycle). Duty cycles may range from 0% (always off) to 100% (always on).

In some examples, the microwave motion detector 100 has a fixed duty cycle. In other examples, the microwave motion detector 100 has a duty cycle that varies based on factors such as mode of operation, time of day/environmental conditions (weather, ambient light). For example, an energy efficient mode may conserve more battery power but use a lower duty cycle (e.g., 1%) compared to a normal mode with a higher duty cycle (10%), a performance mode (50%), or an always on mode (100%).

Figure 1C:
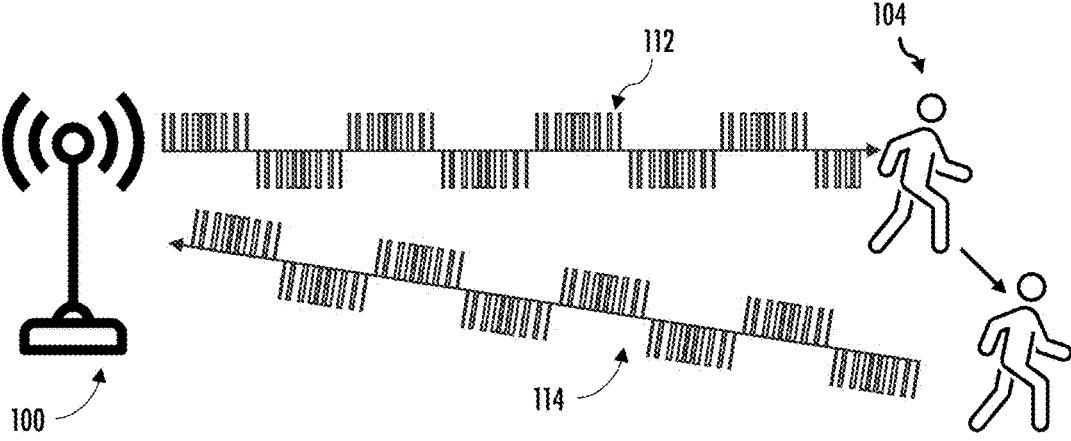

FIG. 1C illustrates operation of a pulse width modulation (PWM) microwave motion detector 100. PWM is a technique that transmits a digital (and unipolar) square wave signal where the duration of the ON time can be adjusted (or modulated) as desired. For example, the microwave motion detector 100 may create a sinusoidal output by switching frequency much higher than the output frequency and varying the duty cycle according to a reference waveform (e.g., the waveform of microwave signal 102). The transmitter of the microwave motion detector 100 emits a square (or square-approximating) signal, microwave signal 112, idling between transmissions. The receiver of the microwave motion detector 100 may receive the doppler-shifted signal 114 reflected off the person 104 (or another object). The microwave motion detector 100 can calculate information about an object, including person 104, based on the doppler-shifted signal 114 reflected off the object (and differences from the transmitted signal, microwave signal 112).

In some variants, the transmitter/receiver on the microwave motion detector 100 may idle/deactivate for a period of time after detecting motion. For example, a motion detecting light may activate and stay illuminated for 15 seconds following activation. In such cases, additional motion detected may not alter device functioning and the transmitter/receiver may idle for a period of time (e.g., 5, 10, or 15 seconds) while the device is active (e.g. the light is on) to conserve power, before returning to an active state.

U.S. patent application Ser. No. 18/765,295, filed Jul. 7, 2024, and entitled "MICROWAVE MOTION DETECTION SYSTEM AND LIGHTING APPLICATIONS", previously incorporated by reference in its entirety, also discloses "shaping" motion detection into zones by modifying transmission power and/or shielding.

As previously alluded to, motion detection may be undesirable in certain locations or through certain barriers. For example, some motion may not be relevant to detect (e.g., motion occurring far away, on a different floor, etc.). Detecting irrelevant motion can cause false positive/undesired activations. Shaping motion detection zones ensures that the transmitter only covers the intended zones (reducing unnecessary coverage). Furthermore, shaping reduces unwanted detections that result in unnecessary activations, etc.

Briefly, microwave signal power attenuates as a function of distance traveled. Tuning transmission power may be used to create an "effective range" of motion detection. In other words, transmission power may be set such that any reflected signals beyond the effective range are below the detection threshold. Effective ranges (transmitter power settings) may be based on a selected device mode. A lighting device may have a number of modes that are associated with a profile. Each mode may be user selected, pre-selected (e.g., fixed) at manufacture, selected based on current conditions (e.g., time of day, weather), and/or determined by the microwave motion detector 100 based on use/a scan of the geometry of the space.

Figure 2:
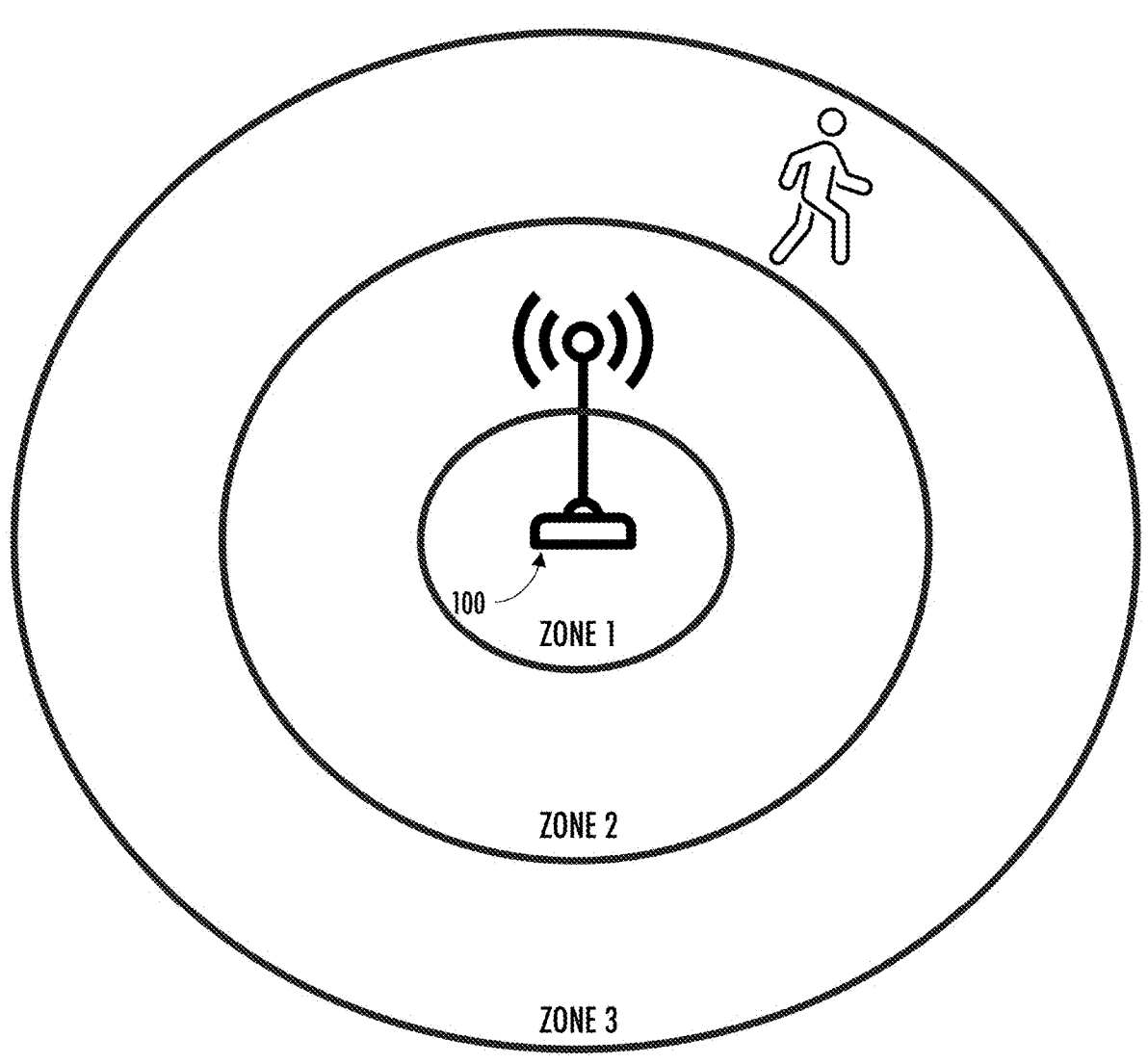
FIG. 2 illustrates a microwave motion detector having zone control

FIG. 2 illustrates microwave motion detector 100 having four zone control. A zone may be the entire range, or a subset. For example, a "ring" may be implemented by checking the reflected signal power against a lower threshold (too far) and an upper threshold (too close).

In a short distance application (e.g., under cabinet lighting), zone 1 may cover a range between 0 and 0.5 meters of the microwave motion detector 100; zone 2 may cover a range between 0.5 and 1.0 meters of the microwave motion detector 100; zone 3 may cover a range between 1.0 and 2.0 meters of the microwave motion detector 100. A longer distance application (e.g., outdoor security lights) may use zones that are much larger (e.g., 0-3 meters, 3-6 meters, 6-9 meters, etc.).

In some lighting variants, zone information may also be used to adjust the light intensity e.g., light intensity may increase as motion is detected in a farther zone to illuminate the detected object. Where motion is detected in multiple zones, device operation may be based on the closer (or further) zone. For example, where a person is detected in zone 1, and another person is detected in zone 3, the lighting device may perform operation based on the motion detected in zone 1. In another example, the microwave motion detector 100 may activate the device when motion is detected at the furthest zone, unless such motion should be ignored because of activity in a closer zone (e.g., a homeowner relaxing in their yard may not want a passer-by to trigger full intensity).

Microwave-based motion detection sensors may detect motion in any direction (e.g., 360°). Motion at certain angles may be irrelevant and controlling motion detection from certain directions may be useful in limiting false positive activations and unnecessary power usage. For example, a ceiling light may be installed on the ceiling of an apartment of an apartment building in order to illuminate a space when someone is home or active in the space. However, upstairs neighbors walking in their apartment might inadvertently activate the ceiling light.

Figure 3:
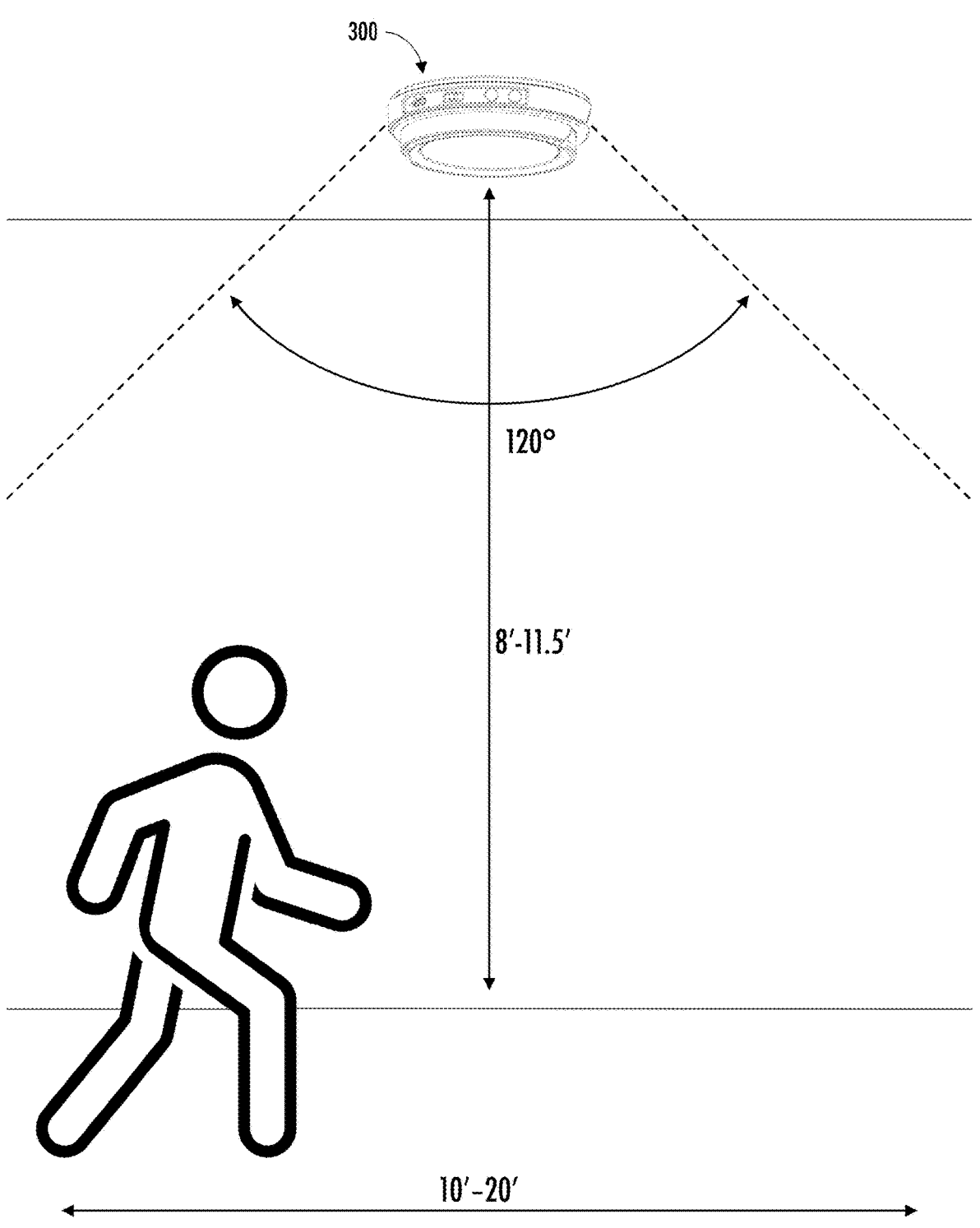
FIG. 3 illustrates a motion activated ceiling light

Metal shielding may be used to control motion detection at certain angles. In certain applications, reflective shielding may redirect/refocus transmitted signal from undesirable areas to areas where motion detection is desired. FIG. 3 illustrates a ceiling light 300, according to aspects of the present disclosure. Metal plated labels may be placed on the side of the ceiling light 300 connected to the ceiling. The shielding may limit transmission of the microwave signals behind the shielding and therefore detection of motion in those undesirable/irrelevant areas. Shielding may extend down the sides of the ceiling light 300 to further limit the angle of motion detection/activation. As shown, the ceiling light 300 may limit the angle of activation of the ceiling light 300 to a certain angle (e.g., 120°). This shielding may limit false-positive activations by an upstairs neighbor.

As will be appreciated by those of ordinary skill given the contents of the present disclosure, the use of shielding may be used differently and the angle or areas shielded from microwave transmission may be different (e.g., greater or lesser) for different end user applications than illustrated in FIG. 3. For example, a larger angle for motion detection (e.g., 160°) may be desirable/relevant where the intended installation height of the ceiling light is greater and therefore shielding may not be used as far down the sides of the ceiling light to allow the microwave signal to pass through to other areas. Motion detection through ceilings/floors may also be relevant to activate lighting (or other functionality) near a staircase or elevator.

As described within U.S. patent application Ser. No. 18/765,295, filed Jul. 7, 2024, and entitled "MICROWAVE MOTION DETECTION SYSTEM AND LIGHTING APPLICATIONS", previously incorporated by reference in its entirety, the improvements to microwave motion detection has enabled a variety of new applications including e.g., cordless lighting systems. Cordless lighting systems are lighting systems that are not hardwired to mains power. Such systems include lighting devices that are battery-operated (using e.g., rechargeable batteries) and/or are self-charging (e.g., using solar power). Cordless lighting systems offers a range of benefits in various settings. For example, the ease of installation of cordless lighting devices, as cordless lights eliminate the need for complex wiring, making them an ideal solution for both temporary and permanent installations. This ease of installation enhances flexibility, allowing users to quickly and effortlessly rearrange lighting configurations. Cordless lights also provide increased portability, enabling users to place them in locations without proximity to electrical outlets. This portability proves particularly beneficial for outdoor events, camping, and emergency situations. Furthermore, the absence of cords enhances the aesthetic appeal of spaces by eliminating visual clutter.

2 "Smart" Home Appliances

In recent years, the smart appliance market has experienced significant growth, driven by increased consumer demand for convenience and the commoditization of computing power. Many households are investing in smart appliances (e.g., refrigerators, ovens, washers, etc.) that offer remote control, energy efficiency, and automated features. Global sales of smart appliances have surged as manufacturers integrate voice assistant compatibility, AI-driven functionality, and sustainability features to meet modern lifestyle needs.

Here, a "smart" appliance is a household device that uses technology to enhance its functionality, usually by connecting to the internet or a home network. Most smart appliances rely on internet connectivity, deploy-once-update-often software/hardware, and centralization, etc.

Briefly, internet connectivity enables smart appliances to connect to other networked devices (e.g., the World Wide Web, as well as other private and/or public intranets, internets, etc.). Internet protocol (IP) network stacks have multiple layers that have distinct responsibilities and protocols, and coordinates with its peer layers and its immediate neighbor layers (above and below). This complexity enables broad support of many different capabilities, across any geography, and flexibly adapts to networking considerations (e.g., flow control, error handling, reliability, etc.). For example, communication protocols at one layer may manage local network addressing (e.g., medium access control (MAC) addresses, etc.) whereas another layer may manage routing across other (remote) networks (e.g., TCP/IP addresses, etc.).

Furthermore, many smart appliances use session-based connectivity to manage information for long-term state information. Session-based communication is also necessary for certain protocols (e.g., TCP, HTTPS, etc.) that need to maintain state—this state information records where communication left off, whether packets were acknowledged, current encryption keys, etc. Session-based communications are also important where multiple streams of data co-exist on the same connection (e.g., HTTP/2 allows multiple requests in one TCP session). Security mechanisms are also commonly session-based e.g., sessions allow secure communication without continuous re-authentication. Session-based communications are also often used in applications to manage identity and context—this is especially important in high-level operating systems that may juggle multiple different applications.

Unfortunately, IP stacks are complicated because they provide reliable and secure communication model through many interrelated layers and protocols. This enables higher-level functionality such as session-based communications, which provides continuity, security, multiplexing, etc. As a practical matter, networking stack complexity is directly related to power consumption—thus, IP stacks are substantially more power hungry than e.g., link-based networks (such as Bluetooth, etc.).

Deploy-once-update-often software/hardware architectures are important for many smart appliance business models. Consumers have ingrained expectations that appliances have long service lives; smart appliances can continually improve over time and keep pace with changing technologies. From a manufacturing standpoint, physical manufacturing requires expensive capital machines that depreciate quickly; software development can be scaled more flexibly. Software-based features can also be subscription-based and/or pay-as-needed, which allows for additional revenue streams and value-add opportunities. Smart features are also used to provide manufacturers with valuable information about how their consumers are using their products, which can be used to improve product offerings (both physical and virtual).

Centralized management is also important for most smart appliance business models. Centralization allows a growing ecosystem of interconnected devices to provide a unified control and user experience. Centralized management also allows a centralized server (or cloud infrastructure) to manage software and/or firmware updates, avoiding unexpected configuration management issues and allowing for secure roll-outs, real-time threat monitoring, and rapid security patching. Centralized management also minimizes on-device processing and enables cross-functional automation and/or coordination.

3 "Smart Enough" Cordless Lighting Systems

Certain appliances may be ill-suited for "smartification". For example, lighting devices generally turn on/off and may respond to certain triggers (e.g., motion-activation, dusk-to-dawn, etc.), etc. Most customers do not expect more capability than that. Such lighting devices may be battery powered and have minimal on-board circuitry. While an IP networking stack may add negligible cost and power consumption to a larger appliance (e.g., a laundry machine, oven, etc.), lighting devices may have very aggressive constraints in these areas. For example, an IP networking stack would require a capable processor and battery capacity—this might greatly reduce battery life for a battery-powered light. In other words, a "smart" lighting system is likely over-designed for connectivity and under-capable with regard to battery life.

Nonetheless, there are some aspects to smart operation that might be adapted to lighting applications. In particular, wired lighting systems often group lights together (e.g., track lighting, etc.) to form zones of lighting that can be switched on/off together. Thus far, coordinating wireless lighting devices together to provide similar functionality has been too complex and expensive to be commercially successful.

To these ends, various aspects of the present disclosure are directed to "smart enough" lighting solutions. Smart enough lighting solutions may include link-based connectivity that enables coordination between peer lighting devices. As discussed in greater detail below, link-based connectivity has significant differences over traditional internet protocol (IP) network stacks. The link-based stack eschews IP network address flexibility for e.g., mesh network communications that can be performed at much less power consumption.

In one specific implementation, a decentralized system may enable groups of smart enough lighting devices to communicate salient events (triggering conditions and operational parameters) across a mesh network, without centralized coordination. In other words, each of the smart enough lighting devices uses point-to-point communication protocols to directly communicate with its peer devices, relaying information throughout the group.

While the following discussion is presented in the context of lighting, the concepts may be broadly extended to other household fixtures and appliances that coordinate their operation, without the benefit of e.g., higher-level operating systems and/or software. This may have broad applicability to environmental applications such as audio, temperature, sensor arrays, and/or other peer-based applications.

In one specific embodiment, the lighting devices use BLE mesh networking to establish linkable communications with one another. BLE is a wireless personal area network technology specifically focused on low energy applications. Most BLE endpoints are expected to power-off to save energy. In fact, most BLE endpoints remain in sleep mode unless a connection is initiated. Usually, actual connection times last only a few milliseconds at a time (compared to Wi-Fi which may maintain connections for hours). *The Specification of the Bluetooth System*, Version 4.0, published Jun. 30, 2010, incorporated herein by reference in its entirety, and its subsequent versions, describe BLE system operations in more detail.

Figure 4:
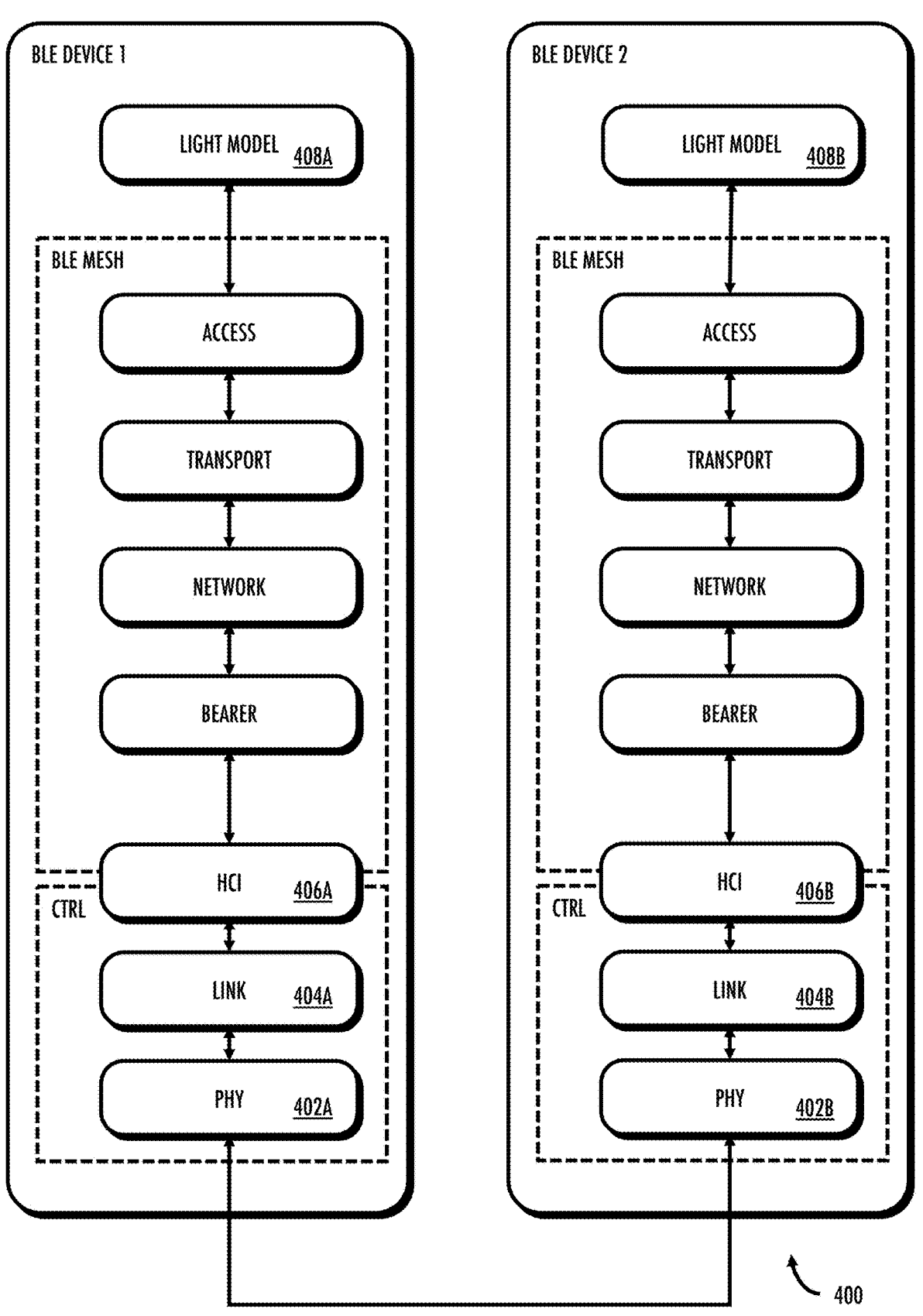
FIG. 4 is a logical block diagram of one Bluetooth Low Energy (BLE) communication stack for mesh networking.

FIG. 4 is a logical block diagram of one exemplary Bluetooth Low Energy (BLE) communication stack 400 for mesh networking. As shown, the BLE protocol is subdivided into a protocol stack composed of different layers of protocols. Each layer of the protocol stack communicates with its logical counterpart in another device; for example, the PHY layer 402A of a BLE device 1 communicates with the PHY layer 402B of BLE device 2, the LINK layer 404A of a BLE device 1 communicates with the LINK layer 404B of BLE device 2, etc. Each layer additionally provides a level of abstraction to the layer above it; for example, the PHY layer handles physical transmission functionality so that the link layer does not need to, etc. In one specific implementation, the BLE protocol stack is logically subdivided into: a Physical layer (PHY layer 402A, PHY layer 402B), a Link layer (LINK layer 404A, LINK layer 404B), a Host Controller Interface layer (HCl 406A, HCl 406B), and mesh networking layers.

The BLE mesh networking layers are defined within e.g., *Mesh Profile, Bluetooth Specification, Revision v*1.0.1, most recently published Jan. 21, 2019, incorporated herein by reference in its entirety. The BLE mesh networking layers extend Bluetooth Low Energy (BLE) to support mesh (many-to-many) device communications, using the BLE advertising bearer (i.e., broadcasting/scanning) to transmit mesh messages.

BLE mesh messaging is performed using a "flood network"—e.g., each relay node of the network that receives a packet that is not already queued and has a time to live (TTL) greater than or equal to 2, retransmits the packet to its peer nodes. The retransmitted packet decrements its TTL by 1. The TTL ensures that packets have a limited number of "hops", avoiding endless loops. Other forms of control path information may also be included. For example, a packet may have source and destination addresses, sequence numbers, opcodes, encryption, and/or keys.

The BLE mesh can support a number of different model functionalities. Model functionality for sensors and lighting are suggested within e.g., *Mesh Model, Bluetooth Specification, Revision* v1.1, most recently published Sep. 12, 2023, incorporated herein by reference in its entirety. Each model suggests a set of functionalities related to e.g., sensor control, lighting control, etc.

Here, each node of the mesh uses a light model layer (light model layer 408A, light model layer 408B). The BLE mesh light model layer may be used to directly control functionalities related to lighting control. This includes dimmable lights as well as tunable and color changing lights. It also includes a light control model that allows specific behaviors triggered by sensors, such as turning lights on based on occupancy or balancing a light level based on ambient light conditions, dimming lights after a period of inactivity and eventually turning lights off.

The BLE Mesh lighting model is typically used in smart industrial lighting to e.g., sync brightness, turn on/off in response to occupancy and/or daylight, and/or centrally/locally control lighting based on mesh messages. The BLE mesh lighting model uses a publish-subscribe messaging. In other words, peers don't send messages directly to each other. Instead, they "publish" messages to a topic or address, only peers that are "subscribed" to the address receive them. Publish-subscribe decouples senders and receivers (reducing reliance on specific paths/nodes for relays), making meshes more flexible, scalable, and resilient.

The BLE mesh network does not have a centralized server node. Instead, the model layers expose a "server model" that preserves state for client-server-like interactions at each of the nodes of the decentralized mesh, rather than a centralized server. More directly, each individual node hosts its own server models that respond to flood network messages from client models. For example, consider a mesh network of lighting devices that have each instantiated a generic on-off server model for their light element, and a generic on-off client model for their microwave motion detector element. When any microwave motion detector (client model) of any node detects motion, it publishes an on/off message to the opcode address. Any peer devices that have subscribed to the opcode address will receive the on/off message via the aforementioned flood network messaging. The server model of the peer devices interprets the on/off message to turn on their light element. Since the lighting devices are peer nodes to one another in the mesh network, the message is relayed peer-to-peer (subject to TTL limits) through the entire mesh network, without using a centralized server node.

While the foregoing example is presented in the context of explicit light manipulation, exemplary embodiments of the present disclosure use mesh network communications to temporarily change trigger conditions.

Consider a mesh network of smart enough lighting devices. Each device includes a lighting element, a set of sensors (e.g., a microwave motion detector, and an ambient light sensor), a battery and/or solar cells, and a mesh network modem (e.g., BLE mesh). Such lights may be used as e.g., under cabinet lighting, solar lamp systems, etc. Initially, the devices are installed by a user and configured to operate as "zone lighting". Zones correspond to different publish-subscribe addresses; in other words, lights that subscribe to the same addresses will receive the same messaging. This allows a zone to coordinate operation with one another.

Figure 5A:
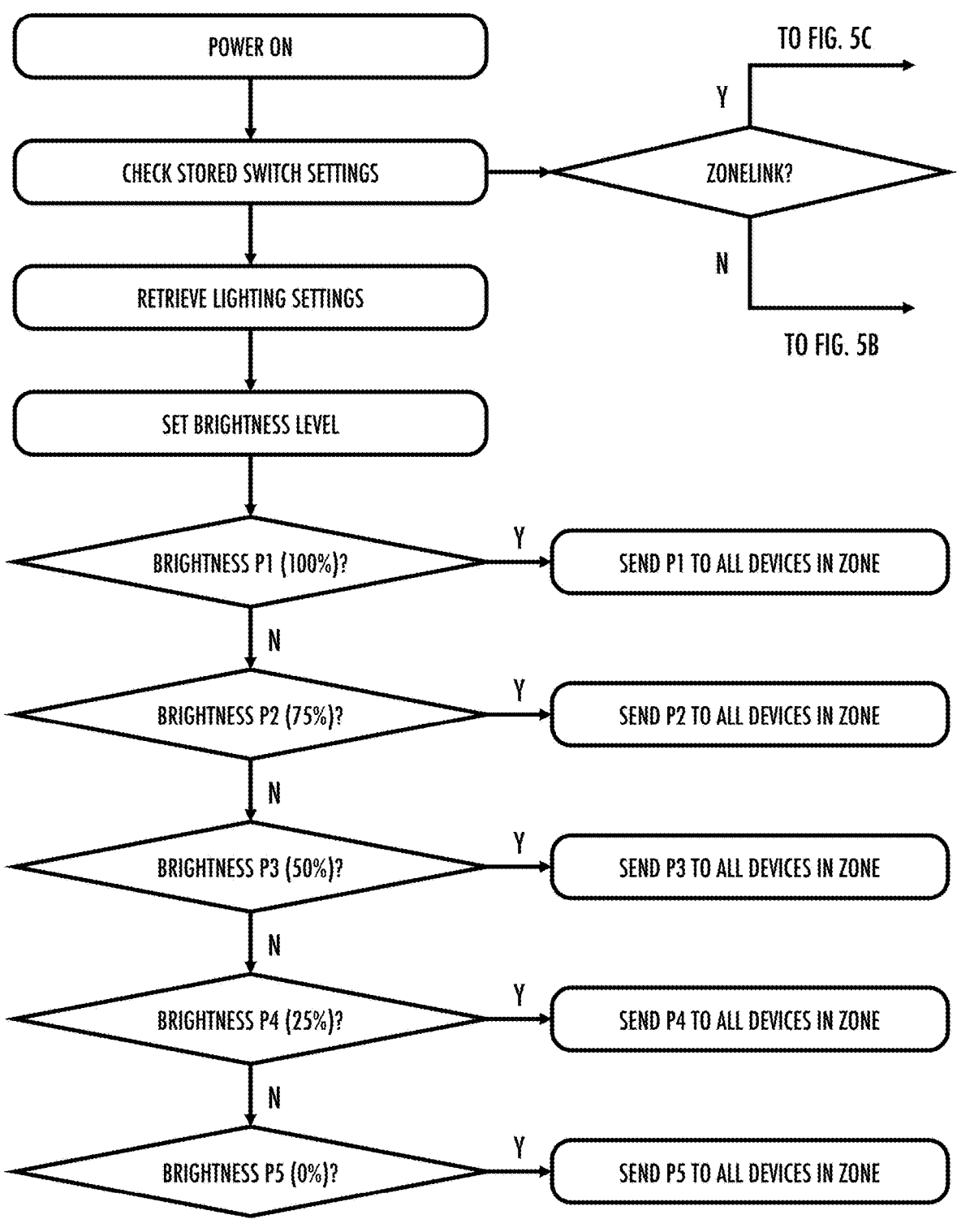
Figure 5B:
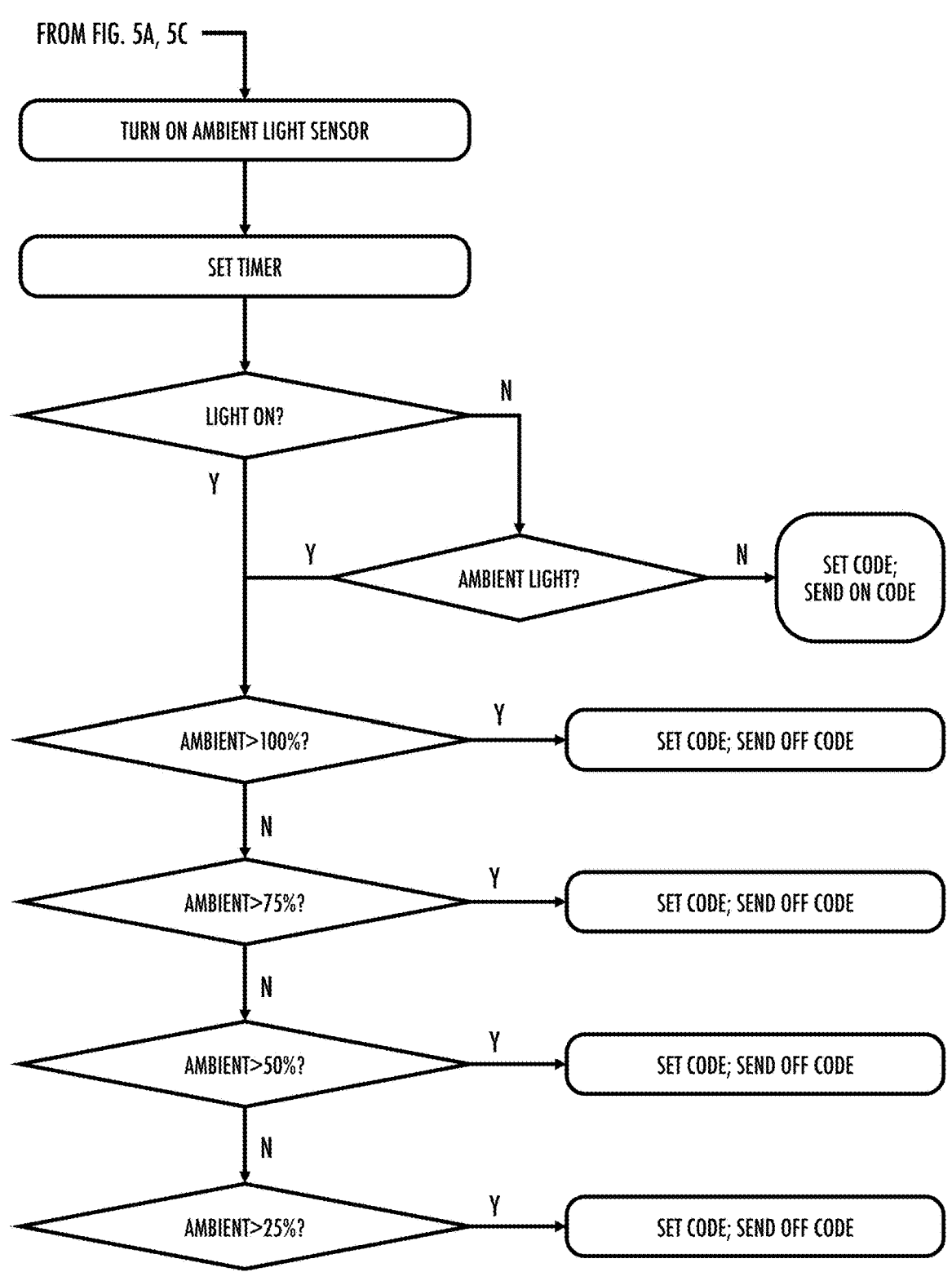

FIGS. 5A-5C present a logical flow diagram for linkable lighting devices, in accordance with various aspects of the present disclosure. As shown, the linkable lighting devices power on and check their stored switch settings. The switch settings determine zoning and operation modes (discussed in FIGS. 5B and 5C, below). Additionally, each lighting device retrieves its light settings and sets its brightness levels. Brightness levels may also be propagated to the rest of the mesh network (e.g., 100%, 75%, 50%, 25%, 0%) via flood messaging.

Switch settings define the zoning of the lights. If the linkable lighting devices are set to standalone (no zone link) or if no peers are found, then the linkable lighting devices will turn on their ambient light sensor, set a timer, and check the sensor to determine whether light is on. If the light is on or if the ambient sensor detects light, then it determines the current light intensity (100%, 75%, 50%, 25%), stores the corresponding code, and sends an off code. In other words, the linkable lighting device is configured to generate light at a specific intensity; if the ambient light exceeds the light output of the linkable lighting device, then it can turn off to save power.

If the linkable lighting devices are zone linked, then as shown in FIG. 5C, the linkable lighting devices connect to other peer devices in their zone and configure themselves for dynamic perimeter security mode or dynamic ambient sensor mode.

In dynamic perimeter security mode, the sensitivity of motion detection (range) is dynamically adjusted based on detected motion. As shown, each linkable lighting device of the zone enables its motion sensor at a first distance (e.g., 0.5 meters for under cabinet lighting, 3 meters for solar lamps, etc.). The linkable lighting devices monitor for motion—if motion is detected, then the BLE mesh network interface is briefly powered on to transmit a message to increase sensitivity. This causes its peers to shift motion detection to a second distance (e.g., the maximum sensor range e.g., 2 meters for under cabinet lighting, 10 meters for solar lamps, etc.). The lights are turned on for the duration of a timer (e.g., 15 seconds, 30 seconds, etc.). The timer may be reset by additional motion detection. However, once the timer expires, the linkable lighting device automatically turns its light off and resets its sensitivity back to the first distance.

Figure 6:
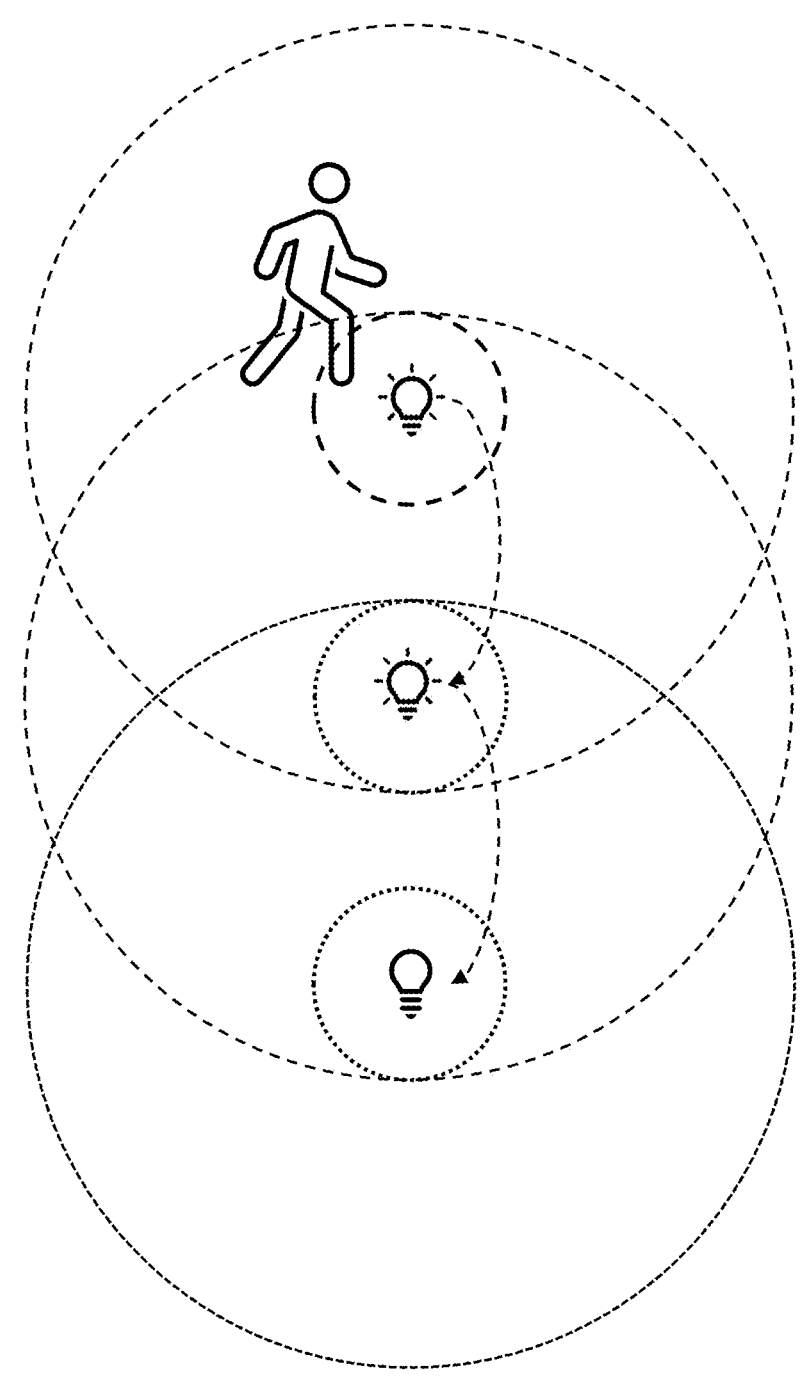
FIG. 6 graphically illustrates one dynamic perimeter security scenario, in accordance with various aspects of the present disclosure.

FIG. 6 graphically illustrates one dynamic perimeter security scenario. In this case, three linkable lighting devices initially operate with a first range. A person is detected at a first device. Responsively, the first device triggers its maximum detection range and notifies a second device.

The second device receives the message and increases its detection range. The second device additionally relays the message to the third device. As shown, the second device detects the person and responsively turns on its light.

The third device receives the message and increases its detection range. However, even at maximum range, the third device cannot sense the person-thus, the third device does not turn on.

After timer expiration, the first device, second device, and third device return to their initial settings. This may be explicitly messaged or may be automatically performed by each device independently.

Referring back to FIG. 5C, dynamic ambient sensor mode shifts the ambient light behavior temporarily into its dusk-to-dawn mode (lighting when dark out). Here, each linkable lighting device of the zone enables its motion sensor at a first distance (e.g., 0.5 meters for under cabinet lighting, 3 meters for solar lamps, etc.). The linkable lighting devices monitor for motion—if motion is detected, then the BLE mesh network interface is briefly powered on to transmit a dusk-to-dawn message, resulting in its peers shifting to a dusk-to-dawn mode. In this mode, the lights will turn on for the duration of a timer (e.g., 15 seconds, 30 seconds, etc.), only if there is no (or below a threshold) ambient light. The timer may be reset if additional motion is detected (extending the duration of lighting).

Figure 7:
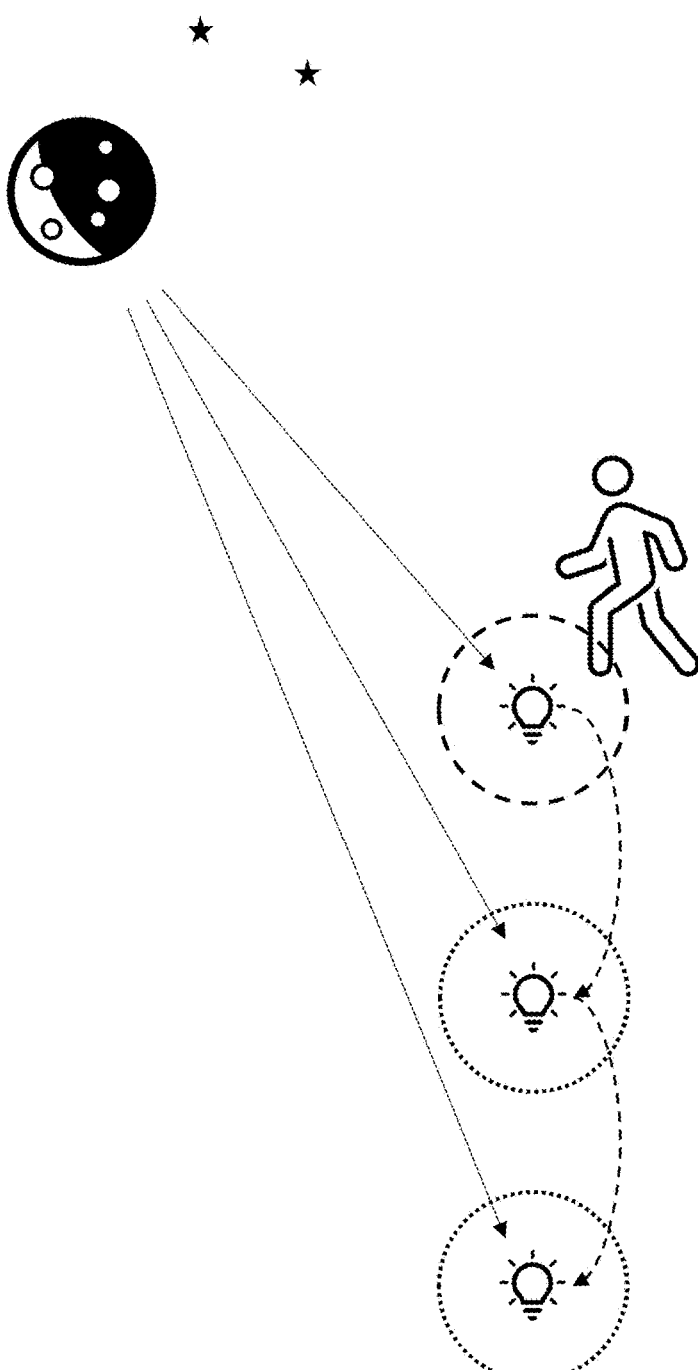
FIG. 7 graphically illustrates one dynamic ambient sensor scenario, in accordance with various aspects of the present disclosure.

FIG. 7 graphically illustrates one dynamic ambient sensor scenario. In this case, three linkable lighting devices initially operate with a first range. A person is detected at a first device. Responsively, the first device shifts into dusk-to-dawn mode for a timed duration and notifies a second device. Here, the first device detects very little light (since it is nighttime) and responsively turns on its light. Once the timer expires, the first device returns to normal operation.

The second device receives the message and shifts into dusk-to-dawn mode for a timed duration. The second device additionally relays the message to the third device. The third device receives the message and shifts into dusk-to-dawn mode for the timed duration. Both the second device and third device detect very little light and turns on their lights. Once the timer expires, the second device and third device return to normal operation.

In either scenario, the devices may individually manage their own operation, coordinate with one another, or implement some hybrid of independent and coordinated operation. Individual management may be based on device-specific timers, triggers, etc. Coordinated management may use communication protocols between the various devices to enable e.g., time synchronization, data transfer, etc. Communication protocols may be e.g., point-to-point, multipoint, and/or broadcast. In some variants, coordinated management may be peer-to-peer, mesh, and/or ad hoc. Hybrids may independently control their operational state and/or coordinate for keep-alive and/or revert state operation.

As but one such example, a first device might detect motion, change to dusk-to-dawn mode, and turn-on its light in response to ambient light. The device may locally set a timer to revert state (e.g., disabling the dusk-to-dawn mode, etc.) and/or revert state responsive to receiving a revert state message from another device. This may allow a group of lights to individually turn-on, but turn-off as a group. Keep-alive messaging may be used to further extend timers, prolonging the duration of light, etc.

4 System Architecture

Figure 8:
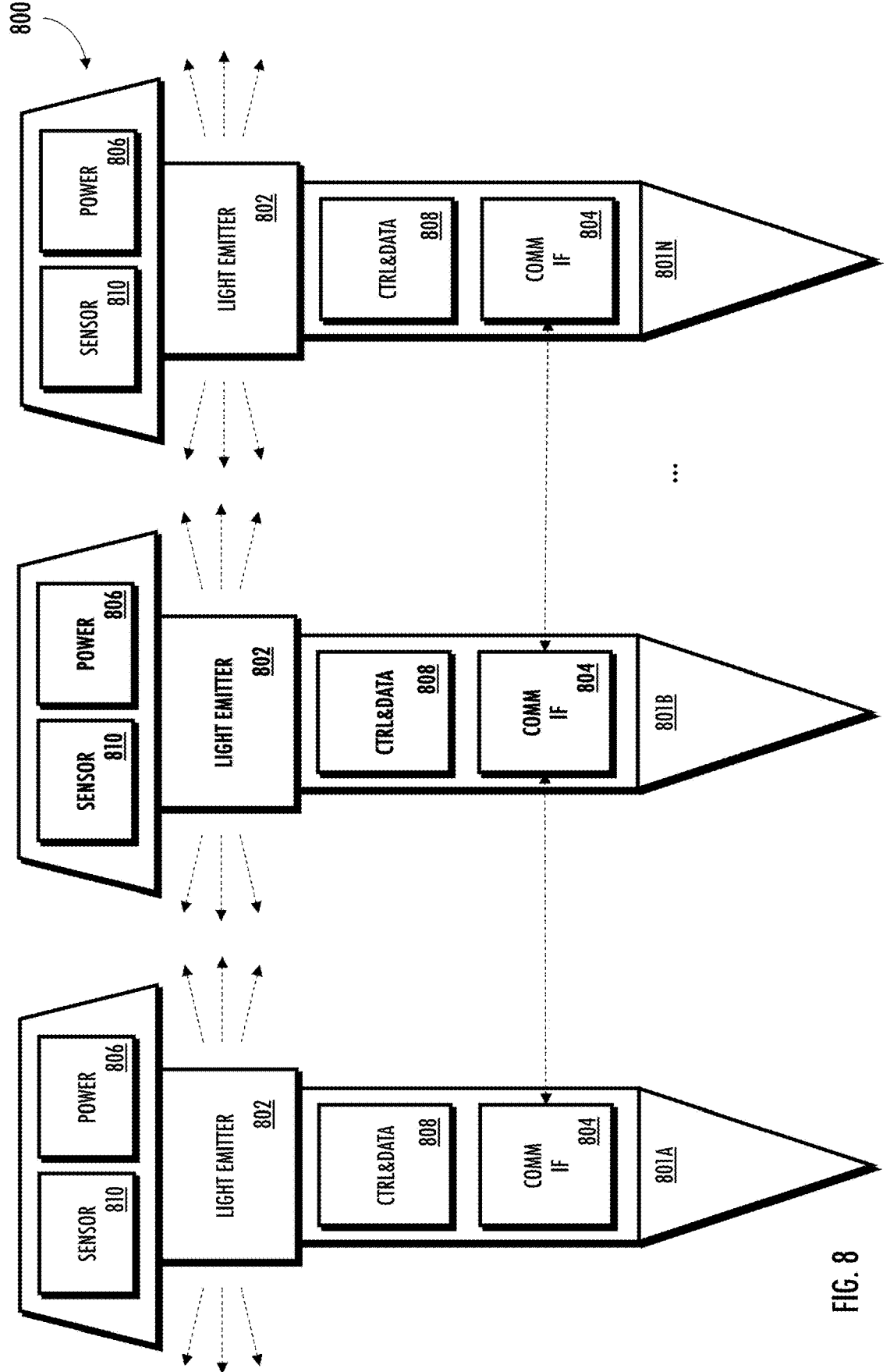
FIG. 8 is a logical block diagram of a lighting system which includes one or more lighting devices, in accordance with various aspects of the present disclosure.

FIG. 8 is a logical block diagram of a lighting system 800 which includes one or more lighting devices (801A, 801B, . . . 801N). Each lighting device of the lighting system 800 may include a light emitting subsystem 802, a communication subsystem 804, a power subsystem 806, a sensor subsystem 810, and a control and data subsystem 808, within a housing.

The lighting devices may initialize to a standalone mode. Once initialized, the lighting devices may attempt to discover the presence of peer devices; when peer devices are present, the peer devices organize into the lighting system 800. The lighting system may be re-organized to add and/or remove lighting devices periodically, as instructed (e.g., by a user), as-needed, etc.

During system operation, the communication subsystem 804 establishes and maintains communication among the one or more peer devices. Each lighting device of the lighting system independently evaluates and performs its tasks (automated lighting) according to a set of operational parameters, via its own control and data subsystem 808. The operational parameters may affect the behavior of the light emitting subsystem 802 and/or the sensor subsystem 810 of the lighting device. In addition, each lighting device may detect conditions that trigger modifications to its operational parameters; these trigger events/modifications may be communicated to the peer devices via the communication subsystem 804, thereby resulting in a coordination of behavior across the peers.

While the illustrated system is presented in the context of a mesh of lighting devices, the system may have broad applicability to any distributed network of elements. As a brief aside, the terms "distributed" and "centralized" refer to a broad spectrum of techniques for organizing control and/or data within a network of nodes. For example, some distributed systems may centralize control of node behavior but distribute data processing. Other systems may centralize data processing but allow each node to independently control its own behavior. Various other systems may perform a hybrid of control and/or data. More generally, the various techniques described throughout may have broad applicability to decentralized coordination for personal, industrial, security, medical, and/or scientific devices.

The following discussion provides functional descriptions for each of the logical entities of the one or more lighting devices (801A, 801B, . . . 801N) and/or lighting system 800. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the lighting system 800 is separately provided below.

4.1 Light Emitting Subsystems

Functionally, the light emitting subsystem 802 emits light as controlled by the control and data subsystem 808. Depending on application, light may be emitted according to an intensity, spectrum, and/or direction. For example, outdoor landscape lighting may use warmer shades of light and/or larger illumination ranges than e.g., indoor cabinet lighting, etc.

In one embodiment, the light emitting subsystem 802 uses static light intensity (e.g., constant power consumption). In other embodiments, the light emitting subsystem 802 may use dynamic light intensity (e.g., varying power consumption). Lighting systems that switch in/out portions of circuitry are one type of dynamic load behavior. For example, Pulse Width Modulation (PWM) and Pulse Density Modulation (PDM) circuits may switch on/off according to different widths or densities. Other examples include electrical subsystems that can be enabled/disabled either in whole or in part. For example, gate logic and other hardware may be enabled/disabled with clock gating and/or power gating. More generally, however, any time varying lighting may be substituted with equal success. For example, Pulse Amplitude Modulation (PAM) may increase/decrease impedance to affect the resulting amplitude. As another such example, variable resistances may be used to adjust current flow (e.g., potentiometers and/or rheostats) of analog circuits.

The static and dynamic behavior of light intensity may be parameterized in a variety of ways. The following listing is illustrative, other parameters may be used with equal success.

A "nominal" quantity is a specified or typical quantity (e.g., voltage, current, frequency, etc.) that an electrical or electronic component, circuit, or device is designed to operate under normal conditions. It serves as a reference value for the expected value. "Maximum" and "minimum" refer to the highest and lowest values, respectively, that a component, circuit, or device can withstand without suffering damage or exceeding its rated specifications. "Peak" and "trough" refer to the highest and lowest values, respectively, that a component, circuit, or device is designed for to maintain proper operation.

An "average" quantity characterizes a quantity over time. While "average" generally refers to an "arithmetic mean" average, other averages may be substituted with equal success. A non-limiting set of examples include: median, mode, geometric mean, harmonic mean, weighted mean, trimmed mean, etc.

An "average" quantity characterizes a quantity over time. While "average" generally refers to an "arithmetic mean" average, other averages may be substituted with equal success. A non-limiting set of examples include: median, mode, geometric mean, harmonic mean, weighted mean, trimmed mean, etc.

A "duty cycle" describes the fraction of time during which a periodic signal (such as a pulse or waveform) is in an active state compared to its total period. For example, an 80% duty cycle (sometimes also referred to as an 80/20 duty cycle) refers to a signal that is on for 80% of the cycle (and off for 20% of the duty cycle).

A "slew rate" refers to the rate at which a signal changes over time. For example, slew rates for voltages are often expressed as volts/microsecond.

A "spectral envelope" is a representation of the amplitude characteristics (magnitude) of the frequencies present in a signal or spectrum. It provides information about the dominant frequency components of a signal. A "roll-off frequency" is the point in a frequency response at which the amplitude or power of the signal begins to decrease rapidly. It is typically defined as the frequency at which the response is reduced by a certain amount, often measured in decibels.

In one embodiment, the light emitting subsystem 802 transduces electrical energy to electromagnetic radiation. EM radiation refers to oscillating electric and magnetic fields that propagate together in the same direction, perpendicular to one another. For example, the light emitting subsystem may be a light module that generates visible light. The light module may include a bulb (incandescent, halogen), light emitting diode (LED), gas-discharge lamp (fluorescent tubes, neon, sodium vapor), lasers, or other light generating device. A bulb includes a wire filament enclosed in a vacuum or inert gas; the resistance of the filament is used to convert electrical energy to heat and light. An LED is composed of a diode junction manufactured from semiconductors with specific electroluminescent properties (e.g., gallium arsenide (GaAs), gallium phosphide (GaP), etc. When electrical energy is applied to the diode junction, electrons are forced to combine with electron holes; this process converts some electrons to photons (light). Gas-discharge lights pass electrical energy through ionized gasses; the ionized gases have quantum energy states so excess energy is released as EM radiation. The EM radiation is absorbed by a phosphor coating, which re-emits it as visible light. Lasers (light amplification by stimulated emission of radiation) use electrical energy to stimulate a gain medium (e.g., gas, liquid, solid); once energized, some atoms of the gain medium emit radiation. The emitted radiation triggers other atoms of the gain medium to emit more radiation; resulting in a rapid amplification of coherent light. The gain medium lies in a resonant cavity of the laser which allows continued amplification even as some portion of the light are output.

In addition to the light generating element, the light module may incorporate passive lenses, diffusers, reflectors, waveguides, and/or any other components or combinations of components configured to direct or disperse the light. For example, lenses are typically manufactured from a transmission medium (e.g., glass, acrylic, polycarbonate, etc.) which has been physically formed to bend (refract) light as it passes through. The lens physical shape may be convex (that causes light to converge), concave (that causes light to diverge), or a piecewise combination. In some applications, multiple lenses may be used in combination to provide refraction characteristics that are not possible (or practical) to implement with a single lens. Diffusers scatter, spread, and/or soften light as it passes through. Examples of diffusers include e.g. diffuser films, prisms, or translucent materials (e.g., frosted glass/acrylic, etc.). Reflectors reflect some (or all) of the light; reflectors are often used to direct light in a particular direction. Reflectors can be made from a wide range of materials, including metals, glass, plastics, and specialized coatings designed for specific wavelengths or applications. The design and geometry of a reflector determine its reflective properties and how it redirects or concentrates light. Waveguides use internal reflection to guide and confine light from one point to another; typical examples of waveguides include e.g. fiber optics for light as well as microwave waveguides and radio waveguides.

More generally, while the foregoing discussion is presented in the context of visible light applications (e.g., security lighting, lanterns, flashlights, head lamps, work lights, etc.), any EM radiator (and associated peripherals) may be substituted with equal success. EM radiation spans a very wide spectrum from e.g., radio waves, microwaves, infrared (IR) or heat, visible light, ultraviolet (UV), x-rays, gamma rays, etc. Such devices may include e.g., telecommunications radios, microwave transmitters/ovens, IR transmitters/elements, UV lamps, X-ray lamps, etc.

While various embodiments of the present disclosure are directed to lighting elements, the concepts may be broadly extended to other distributed applications. For example, distributed acoustic elements and/or sensor elements may be used for sound playback as well as surveillance and/or monitoring applications. As but one such example, a distributed network of speakers may be used to emit sounds and/or audio playback (e.g., a sound system). As another such example, a distributed network of motion detectors, cameras, and/or other sensors may be used to implement a security system.

4.2 Communication Subsystem

Functionally, the communication subsystem 804 enables data transfer between one or more lighting devices (801A, 801B, . . . 801N). The communication subsystem 804 may incorporate a modulator/demodulator (modem). During transmission, the modem modulates digital data into signals (analog waveforms) for transmission via a transmission media (wired or wireless). During reception, the modem demodulates received signals to recover the transmitted data from signal and noise (introduced by the transmission media). For example, a wireless modem may modulate/demodulate digital data into radio frequency (RF) waveforms for transmission/reception over the air. A wired modem may modulate/demodulate digital data into electrical signals for transmission/reception over coaxial cable or optical signals over fiber.

In addition to the modem, the communication subsystem 804 may additionally incorporate hardware, software, and/or firmware logic that implements a communication protocol. Typically, the communication protocol is a structured set of layers that define how data is transmitted, received, and processed across nodes. Each layer in the stack performs a specific function and communicates only with the layers directly above and below it. The stack ensures tasks like data segmentation, error detection, addressing, routing, and session management are handled systematically. This layered approach allows hardware and software from different vendors to interoperate reliably, thus enabling modular and standardized network communication.

Communication subsystems may enable networked communications. A network is a group of two or more interconnected devices or systems that can communicate and share data, resources, or services. Networks may have different levels of complexity. For example, a link-based network is a network that manages communication across physical links. Here, a link refers to the transmission medium (wired or wireless) that enables data transfer between the nodes. An IP-based network is a network where each node is explicitly defined by IP address. An IP address refers to a unique identifier for a node within the network; nodes may receive and pass-along messaging for other nodes.

As a brief aside, mesh networks are link-based networks, however, mesh networks may additionally (but not necessarily) incorporate IP-based networking protocols. In a mesh topology, every node is connected to other nodes through links-forming a web-like structure of direct communication paths. Every node acts as a relay, forwarding data to other nodes along multi-hop paths. Links are defined by their hop distance and routing protocols (e.g., flood, etc.). In other words, mesh routing uses link information for message routing. Examples of link-based mesh networks include BLE mesh (which does not have native IP addressing) and Zigbee (which can be, but is usually not IP-based), etc.

A mesh network may (or may not) support IP-based networks. In such implementations, the IP-based network addressing may be performed at a network layer above the link layer. In the network layer, each node is ascribed an IP address; delivery mechanisms rely on the IP address, rather than the underlying link information, to manage data delivery. For example, IP-based networks focus on whether data from a source IP address was received at the destination IP address (regardless of the physical pathing used to deliver the data). Mesh networks that also support IP-based networking include e.g., Thread (IPv6 over 6LoWPAN), Wi-Fi mesh, etc.

In one specific embodiment, the communication subsystem uses a Bluetooth Low Energy (BLE) mesh networking communication model which supports a link-based mesh network. Communication between the lighting devices uses "flood" delivery (e.g., based on time to live (TTL) and retransmission). In one specific implementation, the flood network uses a publish-subscribe model for communication.

Notably, flood messaging is power efficient where the computational simplicity of routing (no routing tables, route discovery, etc.) outweighs the danger of redundant messaging. Redundant messaging occurs where nodes repeat messages that have already been received; this can cause messaging "storms" and collisions in dense networks. However, the lighting system 800 is expected to use infrequent messaging and sparse placement. Other applications may benefit from more intelligent and/or selective repeating, and/or targeted addressing (e.g., unicast, multicast, etc.).

While BLE mesh networking emphasizes low power communication which is useful for e.g., battery powered devices, other networking schemes may be substituted with equal success. For example, ad hoc networking and peer-to-peer networking may provide decentralized communications between peer devices. Furthermore, certain aspects of the present disclosure may be implemented as a logical layer with networking protocols that provide more flexibility and/or less power efficiency (e.g., IP-based addressing, etc.).

As previously noted, flood messaging uses a repeating message scheme; e.g., a node sends a message to all its neighbors, who in turn repeat it to their neighbors (with a decremented time to live (TTL)), and so on—until the message has propagated through the entire network. While the foregoing discussion is presented in the context of flood messaging, virtually any broadcast and/or multicast technique for disseminating information throughout a network may be substituted with equal success. Various modifications may be used to improve scalability, efficiency, and/or reliability. Examples may include, without limitation, controlled flooding (using TTL and/or sequence numbers to prevent excessive repeating), probabilistic flooding (probabilistic repeating), selective flooding, randomized flooding (also referred to as "gossip" flooding), etc.

Publication-subscription models are power efficient where messaging is broad-based (rather than node specific) and publication is infrequent. Applications that have high publication frequency and/or fine-grained subscription may be better served with other messaging schemes. Alternative implementations may use e.g., client-server models, message queuing, point-to-point messaging, request-reply, event-based messaging, etc.

More generally, artisans of ordinary skill in the related arts will readily appreciate that the foregoing discussions are presented in the context of a power efficient operation for a specific application, but that implementations that optimize for other considerations (e.g., performance, cost, etc.) may substitute other communication protocols with equal success.

4.3 Sensor Subsystem

Functionally, the sensor subsystem 810 detects changes to, or the state of the device, the environment, or another system/device. The sensor subsystem 810 may convert a physical phenomenon into a voltage (e.g., an analog voltage) or digital data as input to the control and data subsystem 808 and/or another device via the communication subsystem 804.

The sensor subsystem 810 may detect a distance, velocity, and/or acceleration of an object relative to a sensor. In one embodiment, a distance sensor may emit a pulse or signal (laser, IR, acoustic waves, etc.), receive a corresponding pulse or signal reflected off a target and determine the time difference between emitting and receiving the pulse/signal and the corresponding pulse/signal to determine a distance. Computer vision-based distance sensors may use a camera or similar image capture device to capture multiple images (taken at different angles or times) to infer a distance to an object/target using parallax/triangulation. Various other techniques for measuring distance and its related qualities may be substituted with equal success.

Certain quantities may be calculated or inferred from distance measurements. For example, speed (change in distance), velocity (magnitude and direction of change in distance), acceleration (derivative of velocity), "jerk" (derivative of acceleration), and "snap" (derivative of jerk), are quantities that may be indirectly inferred based on distance (using derivative and/or integrative calculations) and/or may be directly measured (e.g., using doppler, etc.). Furthermore, these relationships may be leveraged with other measurements; e.g., an inertial measurement unit that captures acceleration may be used to calculate velocity (integral of acceleration, etc.). Still other data structures (e.g., quaternions, etc.) may be calculated, inferred, or otherwise derived based on such measurements.

Inertial sensors may be used to measure the motion of an object (e.g., a lighting device) with respect to an inertial reference frame. Inertial sensors may include gyroscopes, accelerometers, magnetometers, and barometers. The number of axes an inertial sensor may detect is based on the number of different measurements over a number (e.g., 1-3) of different axes. Accelerometers may be used to detect linear acceleration. Gyroscopes may be used to detect a rotational rate. Magnetometers may detect a magnetic field and be used to determine a magnetic field (e.g., of the earth) for use, e.g., as a heading reference. In some examples, an inertial sensor may include one accelerometer, gyroscope, and magnetometer per axis for each of the three principal axes: pitch, roll and yaw.

In some examples, inertial sensors may be used to determine movement of the device and calculating position and velocity (via, e.g., dead reckoning). The lighting device may adjust, in certain operating modes brightness/operating mode when the device is moving or not moving (e.g., going to or out of an idle mode) after a certain threshold of time elapses without movement. Gestures may be determined using inertial sensor data to determine user input. In some cases, operating modes may be determined or altered based on these determined gestures. Gestures may include shaking the device, spinning the device, tossing the device, etc. in particular directions or a certain number of times.

Motion sensors detect the motion of objects in a specific area. A Passive Infrared (PIR) motion sensor is a device that detects motion by measuring changes in infrared radiation caused by the movement of warm objects. PIR sensors are "passive" because they do not emit any energy on its own; rather PIR sensors simply detect the infrared radiation emitted or reflected by other objects. Microwave motion detection operates by emitting continuous microwave signals into the monitored area and analyzing the reflections caused by moving objects. The motion detection sensor contains a transmitter that emits microwave signals, typically in the gigahertz (e.g., 10.525 GHz) range, and a receiver that captures the reflected signals. When there is no motion, the emitted and received signals match, indicating a static environment. However, when an object enters the monitored zone and disrupts the microwave pattern, the sensor detects a Doppler shift in the reflected signals due to the object's movement. The Doppler shift is caused by the change in frequency as the object approaches or moves away from the sensor. The sensor's electronics analyze these frequency changes to determine the speed, direction, and presence of motion. Different types of motion sensors may be used to detect motion in various directions and through objects (e.g., walls) by blocking or allowing the signal to pass through.

Global positioning/navigation sensors include receivers that may receive and track signals from one or more Global Navigation Satellite System (GNSS)/Global Positioning System (GPS) satellites in a constellation. These messages may include time information, satellite status/health information, satellite orbit data, etc. This data may be decoded to determine the position, velocity, and time of the receiving device (e.g., a lighting device) in combination with the messages from other satellites in the constellation.

In some examples, timing information may be used to power on/off the device (e.g. at a particular time of day or with respect to an astronomical event, e.g., sunrise or subset). Geofencing can be used to change device operation based on the determined position. For example, certain areas may not allow lighting above a certain brightness. The lighting device may limit the brightness of the LED in those areas.

More generally, any measurement of position and its derivatives/integrals may be substituted with equal success. Position may be absolute (e.g., within a reference frame) or relative (e.g., with respect to the sensor). Depending on application, the measured position, velocity, acceleration, etc. may be attributed to the target/object, the sensor, or some combination of target/object motion and sensor motion. While the foregoing examples assume linear quantities, angular/rotational quantities may be substituted with equal success (e.g., angular position, angular velocity, etc.). Additionally, related quantities (e.g., momentum, kinetic energy, work, power) may be calculated based on known or estimated mass, etc.

The sensor subsystem 810 may detect the intensity, presence, and/or color of light. A photosensitive sensor (also known as a photodetector, light sensor, or photoelectric sensor) is a device that detects and responds to light. These sensors convert light energy (photons) into an electrical signal, and they are widely used in applications ranging from automatic lighting systems and camera exposure controls to industrial automation and scientific instruments. Some photosensors rely on the photoelectric effect; e.g., incoming light photons transfer energy to electrons, allowing them to jump from a lower energy state to a higher one. This creates a current or a change in voltage that can be measured. More esoteric sensors may use photoconductivity; e.g., the resistance of the sensor material decreases as light intensity increases. This change in resistance can be detected in an electrical circuit.

Since photoelectric effects are directly related to photons (and by extension lumens), photodetectors may also incorporate thresholding to e.g., detect light of a specific intensity and/or ranges in intensity. As but one such example, photodetectors may be used to detect the presence and/or absence of light within certain ranges to e.g., detect daytime, nighttime, and dawn/dusk. In some cases, thresholding may additionally be combined with time windowing and/or light filtering to avoid or minimize false alarms (errant light from e.g., headlights, flashlights etc.)

Photosensors may be coupled with a variety of passive and/or active filter elements to detect certain types of light. Examples may include e.g., wavelength (color) filters, neutral density filters, polarizing filters, dichroic filters, etc. Photosensors may additionally be used to sense EM radiation that is outside the spectrum of visible light (e.g., UV, infrared, etc.). More generally, any measurement of light characteristics (intensity, color, direction, collimation, polarization, etc.) may be substituted with equal success by artisans of ordinary skill in the related arts.

In one specific implementation, ambient light sensors (ALS) measure the brightness of light (lux) incident on a surface. ALS may be configured to be sensitive to radiation within the range of human vision (approximately 300-1100 nm). In some examples, an ALS may be constructed using a silicon photodiode that converts light to an electrical signal using the photoelectric effect. The silicon photodiode may include filters to block certain wavelengths of radiation, such as ultra-violet and infra-red. In some exemplary applications, a camera or photocell may be used as an ALS.

As one specific example, an ALS may be used to measure the light in the environment near the lighting system. The lighting system may adjust, in certain operating modes (e.g., an automatic lighting mode), the brightness and/or color temperature of the LEDs in response to the determined brightness or color temperature detected by the ALS. LEDs may be powered on when an ALS detects light intensity below a threshold amount.

The sensor subsystem 810 may detect temperature. Temperature sensors may detect/measure heat and convert the measurement into an electrical signal. As but one such example, temperature sensors may measure radiation (e.g., IR radiation) emitted by an object. In other examples, a voltage may be detected across a diode to determine a resistance. Since the resistance of the diode varies proportionally to a change in temperature, temperature may be determined based on, e.g., by converting, the voltage reading. In further examples, dissimilar materials (e.g., two metals) that have different expansion/contraction properties, are used to determine a temperature/a change in temperature. For example, in a vibrating wire temperature meter, a stretched magnetic wire with two ends fixed to the dissimilar metals can detect changes in temperature based on a change in the vibrations of the wire. This may be due to a change in tensile strength of the wire because of the expansion/contraction of the metals. In another example, a thermocouple may sense temperature changes by detecting a voltage where dissimilar metals are joined at the point of connection.

Depending on technology, temperature sensors may be based on contact, internal temperature, ambient, and/or across a distance (e.g., non-contact). For example, temperature sensors may be used to measure the temperature of components in the lighting devices. In one specific implementation, the temperature of LEDs or a LED assembly may be monitored via a temperature sensor. In other examples, the ambient temperature may be monitored via a temperature sensor. In further examples, the temperature of a target may be measured over a distance (e.g., using IR detection).

Electrical sensors may monitor, calculate, or determine a current, voltage, or other related quantity (e.g., power, etc.). For example, a voltage sensor may be able to determine the voltage level of alternating current (AC) or direct current (DC) power sources. Voltage sensors may include a voltage divider and bridge where the output voltage is measured across an impedance. Voltage sensors typically are categorized into resistive types and capacitive types. Resistive sensors can be used to measure static or dynamic voltage across the resistors. In contrast, capacitive sensors can only be used to measure time-varying voltages across the capacitors; but capacitive coupling does not require direct electrical contact (touchless sensing). Voltage sensors may be used to detect power failures and faults, the addition or changing of a load, to control temperature, to control power demand, and to determine the amount of charge remaining in power sources.

A current sensor measures the flow of electric current through a conductor. There are several types of current sensors; e.g., shunt resistor-based sensors that rely on Ohm's law, Hall effect sensors which detect current induced magnetic fields, Rogowski coils which detect a rate of change of current induced magnetic fields, current transformers which rely on electromagnetic induction, magnetoresistive sensors which measure the resistance change in a magnetoresistive material, etc.

Certain quantities may be calculated or inferred from electrical measurements. For example, energy, power and their derivatives (instantaneous power, real power, reactive power, apparent power) may be directly calculated from voltage and current. Similarly, resistance, impedance, admittance, and conductance can all be calculated using voltage and current. Other common measurements may include power factor, phase angle, etc 4.4 Power Subsystem Functionally, the power subsystem 806 delivers power from one or more power sources to the other components of the lighting devices. In addition, the power subsystem 806 may also provide conditioning to compensate for differences between the required and provisioned electrical characteristics. For example, the power subsystem 706 may ensure that the voltage and current provided from the selected batteries, solar cell, wall outlet, etc. match the load requirements in terms of nominal values, rate of use, frequency, etc.

As a brief aside, a "closed" electrical circuit provides a path for electric current to flow from a power source across a load; an "open" electrical circuit means that the path from a power source to a load has a gap which prevents the flow of electrical current. Most electronics are designed for just a single power source and often directly connected power sources to the load, e.g., a battery might directly drive a bulb. Selectively providing power from multiple different power sources requires careful management of both the load requirements and the source output to prevent e.g., voltage/current mismatch, chemistry rate mismatch, capacity mismatch, etc.

The power sources of a power subsystem 806 may be characterized with source parameters. For example, source parameters for a battery might include its nominal voltage, maximum/minimum voltage, maximum current draw, etc. As a practical matter, many types of power sources do not provide information about their internal operations; for example, a battery may have a nominal voltage but the remaining charge is unknown. Similarly, a solar cell might provide power according to light which may vary, or an AC wall circuit might be shared with other loads.

Some devices may characterize the power sources with characteristic functions. As used herein, the term "characteristic function" and its linguistic derivatives refers to a relationship between known and unknown quantities. For example, the measurable initial voltage across the terminals of a battery may be used to estimate the unknown remaining charge of the battery. Similarly, the voltage/current and/or line noise of an AC power supply may be used to characterize the unknown loads that are sharing the circuit, etc. Characteristic functions may be empirically determined, based on historic data, defined by manufacturer, user, vendor, etc. More directly, any technique for estimating an unknown quantity from observable quantities maybe substituted with equal success.

Power sources may be characterized by their output voltage and maximum supported current draw. Typically, power sources cannot provide voltage/current according to idealized curves. For example, a typical battery may have been specified to a nominal voltage and total capacity (number of Coulombs), however, limitations of the battery chemistry and parasitic impedances will affect the actual maximum output current. Similar limitations exist for other forms of power generation (e.g., solar power, outlet power, fuel cells, etc.). Thus, different power sources may have different utility for meeting the dynamic needs of the load subsystem.

In one specific implementation, the lighting devices use battery power. Batteries are typically either single-use or rechargeable. Compared to rechargeable batteries, single-use batteries store charge longer in extreme temperatures and when not in use (the so-called "self-discharge rate" is the rate at which the stored charge in a battery is reduced due to internal chemical reactions of the battery). Certain types of alkaline batteries, for example, have a shelf life of ten years.

Rechargeable batteries may not have the same performance as single-use batteries, however rechargeable batteries have significantly better lifetime ownership costs. Many high-power output products today consume single-use batteries in just a few hours, and performance is frequently inferior to rechargeable batteries at low battery life. Replacement costs can quickly eclipse the low per unit cost of single-use batteries. Further, rechargeable batteries, while having a larger up-front cost than single-use batteries, can be recharged with relatively inexpensive power from, e.g., an outlet. As a result, rechargeable batteries allow for more cost-effective use over their lifetime.

Most batteries use one or more electrochemical cells to store energy as a chemical potential between reactants. During discharge, a chemical reaction converts high-energy reactants to lower-energy products, and the free-energy difference is delivered to the external circuit as electrical energy. Rechargeable battery chemistries allow for both charging and discharging cycles (e.g., charging the cell reverses the chemical process). Batteries come in a variety of sizes and chemistries. Examples of battery chemistries include, without limitation: alkaline, lithium-ion, lead-acid, nickel-cadmium, nickel-metal hydride, lithium polymer, zinc carbon, silver-oxide, zinc-air, sodium-ion, etc. Commonly available single-use sizes include without limitation: AA, AAA, C, D, etc. Rechargeable batteries are available in the legacy cell formats, but also have new formats such as: 10440, 14500, 18650, 26500, 32600, etc.

In one embodiment, the power subsystem 806 uses batteries to store power. In some variants, the lighting devices may house multiple power sources of different types and sizes. For example, a device may have a combination of rechargeable and single-use (dry cell) batteries. The rechargeable batteries may be removable or permanently affixed. The batteries may be stored and used in a removable battery cartridge (housing). The differences in their individual capacities, discharge rates, and chemistries may be suited to certain tasks. For example, the AA cells may be useful for low intensity, short duration tasks (e.g., low illumination settings, soft background music, etc.). D cells may allow for high intensity, long duration tasks (e.g., high intensity lights, klaxon alarms, public address volumes, etc.). The rechargeable cells may be suitable to offload tasks and lengthen the usable life of the single-use cells. In some cases, the rechargeable cells may be charged in device when external power is available e.g., via holster, solar cells, AC adaptors for outlets, etc.

In some implementations, the power subsystem 806 may incorporate internal batteries. Internal batteries are an integral part of the system's structure and are typically not removeable without e.g., specialized tools, voiding the device warranty, etc. Internal batteries are often used to e.g., support specialized power requirements, enable aggressive design form factors, incorporate proprietary technologies, and/or to reduce the cost of single-use/disposable type devices. In some implementations, the power subsystem 806 may include housings and connection interfaces to allow for external battery connections; this allows the user to remove and replace batteries. Still other implementations may include both internal and external battery components.

While the foregoing discussion is presented in the context of electro-chemical cells, the concepts are broadly applicable to any power storage apparatus. Examples of other electro-chemical techniques include, e.g., generators and fuel cells that consume fuel to generate electrical energy. Furthermore, the power subsystem 806 may incorporate other sources of power such as electro-optical cells (solar cells), electrical interfaces (e.g., wall socket power), and/or any other source of power.

In some embodiments, the power subsystem 806 may include solar cells. Solar cells (or photovoltaic (PV) cells) convert photons into electricity using the photovoltaic effect. During photovoltaic operation, photons (from e.g., sunlight) strike the semiconductor array of the solar cell, transferring energy to the electrons in the array. The energy is sufficient to free the electrons (negative charge carriers) from the array, leaving "holes" (positive charge carriers). The mobile charge carriers (electrons and holes) are separated to create a current flow. Specifically, the semiconductor array has p-n junctions with electrical fields that: push the electrons toward the n-side of the p-n junction, and push the holes toward the p-side of the p-n junction. The amount of generated current is based on the amount of photon; stronger light intensity results in stronger current flow.

The photovoltaic effect generates about 0.5V per silicon cell (measured as an open-circuit voltage). The efficiency (conversion from light energy to electrical energy) of photovoltaic cells is about 15%-25%; different semiconductor substrates have different degrees of efficiency. For example, monocrystalline silicon is highly efficient but also very expensive; polycrystalline silicon is more economical at with only marginally less efficient conversion. While silicon is the most common photovoltaic cell, other materials may be substituted with equal success-common examples include thin film (e.g., CdTe, CIGS, etc.), Perovskite, and/or organic polymers.

In some embodiments, the power subsystem 806 may support mains power (AC wall outlet power). As a brief aside, alternating current (AC) and direct current (DC) are two fundamentally different ways of transmitting and using electrical energy. AC voltage periodically reverses direction. It continuously alternates between positive and negative cycles, creating a sinusoidal waveform. In contrast, DC voltage is unidirectional, meaning it flows in a constant direction from positive to negative terminals. AC is typically used for transmission and distribution because it can be easily transformed into different voltage levels using transformers. It is also used in most household and commercial electrical systems because it is easy to generate and distribute. Conversely, DC circuits are generally simpler; for example, a DC motor can vary speed and provides consistent torque (both of which are difficult to do with AC motors). DC circuits are commonly used in hand tools, electronic devices (like smartphones and laptops), automotive systems, and some specialized applications like solar photovoltaic systems.

In some embodiments, the power subsystem 806 may incorporate rectifiers, inverters, and/or transformers. A rectifier may be used to convert alternating current (AC) voltage into direct current (DC) voltage. It "rectifies" the AC waveform by allowing current to flow in only one direction. An inverter does the opposite of a rectifier; it "inverts" DC voltage into AC voltage. Inverters generate a sinusoidal or modified sine wave AC output. Transformers can be used to increase (step-up) or decrease (step-down) the voltage level of an AC voltage without changing its frequency.

Transformers have a variety of useful properties. First, transformers may be used to match the voltage of electrical equipment to the available supply voltage. For example, industrial equipment may require a specific voltage level that differs from the standard distribution voltage. Secondly, transformers may be used to match the impedance between two components of a circuit, optimizing power transfer. This is particularly important in audio systems and radio frequency applications. Thirdly, transformers can introduce a controlled phase shift between the input and output voltages. This property is used in various applications, including power factor correction and inductive coupling in electronic circuits.

Another consideration for power sources is recharging functionality. During charging operation, the power subsystem 806 may recharge a battery (converting electrical energy to a chemical potential for storage). The charging process is typically a multi-stage process that e.g., delivers a constant current to the battery until the battery reaches a specified voltage level (a so-called "constant current" stage), deliver a constant voltage until the battery no longer consumes current (a so-called "constant voltage" stage), and maintains a low current to the battery to top-up from self-discharge (a so-called "trickle charge" stage). In some embodiments, the power subsystem 806 can both provide power, while also concurrently charging. For example, a device that may operate from wall socket power while also using excess power to charge its batteries.

In some variants, the power subsystem 806 may include a charging circuit that additionally monitors the charging source and destination to ensure that the charging process operates safely (overcharging can damage batteries and/or result in catastrophic failures). For example, charging circuitry may include circuitry to prevent over (and under) charging of a battery. The circuitry may include a protection circuit module (PCM) configured to manage basic safety functions of the battery including over-voltage, under-voltage, and over-current. In some cases, the PCM additionally monitors battery temperature which can be used to infer aspects of battery operation (e.g., performance, charging state, etc.). In some additional examples, the charging circuitry includes a secondary safety circuit to protect the battery from charge in the event the primary safety circuit fails.

More generally, artisans of ordinary skill in the related arts will readily appreciate that integrating multiple power sources within a single system to service a variety of dynamic loads may require additional supporting circuitry to address these differences. For example, a system may have a transformer to step-down AC power, a rectifier to convert the reduced AC power into DC power, and a charging circuit that manages the battery charging process. As another such example, an inverter may be used to convert DC power to AC power for devices that are usually used with wall outlets.

4.5 Control and Data Subsystem

Functionally, the control and data subsystem 808 independently evaluates and performs its tasks (automated lighting) according to a set of operational parameters. In one specific implementation, the control and data subsystem 808 controls the light emitting subsystem 802 based on sensed information captured via its sensor subsystem 810. The control and data subsystem 808 may use a number of operational parameters to control illumination; for example, the operational parameters may affect trigger conditions, illumination intensity, etc. In addition, the control and data subsystem 808 may communicate information (trigger events, operational parameters, etc.) to its peer devices via the communication subsystem 804, thereby coordinating group behavior. The following discussions provide several illustrative embodiments of control and data subsystem 808, however, artisans of ordinary skill in the related arts given the contents of the present disclosure will readily appreciate that the virtually any control and data logic may be substituted with equal success.

In one exemplary embodiment, the control and data subsystem 708 may include a processor and a non-transitory computer-readable medium that stores program instructions and/or data. During operation, the processor performs several actions according to a clock. These may be logically subdivided into a "pipeline" of processing stages. For example, one exemplary pipeline might include: an instruction fetch (IF), an instruction decode (ID), an operation execution (EX), a memory access (ME), and a write back (WB). During the instruction fetch stage, an instruction is fetched from the instruction memory based on a program counter. The fetched instruction is provided to the instruction decode stage, where a control unit determines the input and output data structures and the operations to be performed. These input and output data structures and operations are executed by an execution stage. For example, an instruction (LOAD R1, ADDR1) may instruct the execution stage to "load" a first register R1 of registers with the data stored at address ADDR1. In some cases, the result of the operation may be written to a data memory and/or written back to the registers or program counter.

Artisans of ordinary skill in the related arts will readily appreciate that the techniques described throughout are not limited to the basic processor architecture and that more complex processor architectures may be substituted with equal success. Most processor architectures implement e.g., different pipeline depths, parallel processing, more sophisticated execution logic, multi-cycle execution, and/or power management, etc.

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU may be primarily used to control device operation and/or perform tasks of arbitrary complexity/best-effort. CPU operations may include, without limitation: best-effort operating system (OS) functionality (power management, UX), memory management, etc. Typically, such CPUs are selected to have relatively short pipelining, longer words (e.g., 32-bit, 64-bit, and/or superscalar words), and/or addressable space that can access both local cache memory and/or pages of system virtual memory. More directly, a CPU may often switch between tasks, and must account for branch disruption and/or arbitrary memory access.

As another example, a microcontroller may be suitable for embedded applications of known complexity. Microcontroller operations may include, without limitation: real-time operating system (OS) functionality, direct memory access (DMA) based hardware control, etc. Typically, microcontrollers are selected to have relatively short pipelining, short words (e.g., 8-bit, 16-bit, etc.), and/or fixed physical addressable space that may be shared with hardware peripherals. Typically, a microcontroller may be used with static/semi-static firmware that is application specific.

In one embodiment, data may be stored as non-transitory symbols (e.g., bits, bytes, words, and/or other data structures.) In one specific implementation, the memory subsystem is realized as one or more physical memory chips (e.g., NAND/NOR flash) that are logically separated into memory data structures. The memory subsystem may be bifurcated into program code (e.g., operational mode selection instructions) and/or program data (not shown). In some variants, program code and/or program data may be further organized for dedicated and/or collaborative use. For example, a microcontroller and hardware driver may share a physical memory buffer to facilitate data transfer without memory indirection. In other examples, a microcontroller may have a dedicated memory buffer to avoid resource contention.

Application specific integrated circuits (ASICs) and field-programmable gate arrays (FPGAs) are other "dedicated logic" technologies that can provide suitable control and data processing. These technologies are based on register-transfer logic (RTL) rather than procedural steps. In other words, RTL describes combinatorial logic, sequential gates, and their interconnections (i.e., its structure) rather than instructions for execution. While dedicated logic can enable much higher performance for mature logic (e.g., 50X+ relative to software alternatives), the structure of dedicated logic cannot be altered at run-time and is considerably less flexible than software.

Application specific integrated circuits (ASICs) directly convert RTL descriptions to combinatorial logic and sequential gates. For example, a 2-input combinatorial logic gate (AND, OR, XOR, etc.) may be implemented by physically arranging 4 transistor logic gates, a flip-flop register may be implemented with 12 transistor logic gates. ASIC layouts are physically etched and doped into silicon substrate; once created, the ASIC functionality cannot be modified. Notably, ASIC designs can be incredibly power-efficient and achieve the highest levels of performance. Unfortunately, the manufacture of ASICs is expensive and cannot be modified after fabrication—as a result, ASIC devices are usually only used in very mature (commodity) designs that compete primarily on price rather than functionality.

FPGAs are designed to be programmed "in-the-field" after manufacturing. FPGAs contain an array of look-up-table (LUT) memories (often referred to as programmable logic blocks) that can be used to emulate a logical gate. As but one such example, a 2-input LUT takes two bits of input which address 4 possible memory locations. By storing "1" into the location of 0 #b'11 and setting all other locations to be "0" the 2-input LUT emulates an AND gate. Conversely, by storing "0" into the location of 0 #b'00 and setting all other locations to be "1" the 2-input LUT emulates an OR gate. In other words, FPGAs implement Boolean logic as memory-any arbitrary logic may be created by interconnecting LUTs (combinatorial logic) to one another along with registers, flip-flops, and/or dedicated memory blocks. LUTs take up substantially more die space than gate-level equivalents; additionally, FPGA-based designs are often only sparsely programmed since the interconnect fabric may limit "fanout." As a practical matter, an FPGA may offer lower performance than an ASIC (but still better than software equivalents) with substantially larger die size and power consumption. FPGA solutions are often used for limited-run, high performance applications that may evolve over time.

4.5.1 Linked Lighting Operation

While the following discussion is presented in the context of two processes, each process may be separated into multiple processes (and performed by e.g., different subsystems of the lighting system 800) and/or may be combined with other processes or further subdivided into other processes with equal success. Additionally, the following steps are discussed in the context of software instructions stored on memory and executed via a processor, however alternative implementations may use dedicated hardware (combinatorial and sequential logic) and/or firmware (software/hardware hybrids).

In one embodiment, the non-transitory computer-readable medium includes a first routine 900 that enables operational parameter distribution. In some variants, the first routine 900 is executed by the control and data subsystem; in other variants, the first routine 900 is executed by the communication subsystem. Still other variants may implement portions of the routine by either or both of the subsystems. When executed, the first routine 900 causes the lighting device to: discover its peer nodes (if any) and quiesce communications. When an operational parameter is updated, the communication subsystem is woken, and the updated operational parameter is distributed to the peer nodes.

At step 902, the device attempts to discover one or more peer nodes. If peer nodes are discovered, then the communication logic creates a new network with the peer nodes (if no network exists) or joins an existing network of peer nodes. In some embodiments, the network may be a link-based network such as a mesh network. In other embodiments, the network may enumerate peer nodes according to an addressing scheme (e.g., an IP-based network). More broadly, any scheme for information dissemination may be substituted with equal success; e.g., broadcast, multicast, unicast (point-to-point), etc.

If no peer nodes are discovered, then the communication logic may transition to a standalone configuration. In standalone configuration, the communication logic may be powered-down to reduce power consumption. Periodically, intermittently, when-instructed, etc., the communication logic may re-attempt discovery from standalone operation.

In some embodiments, the user may control or otherwise configure devices of the network; for example, a user may assign devices to one or more zones or other grouping. As but one such example, a user may assign a node to a zone during installation, or after deployment. In some cases, the zone may be set using manual switches. In other embodiments, the zone may be set using a remote control and/or remote control application (e.g., executed from a user device or server, etc.).

In one such embodiment, a network comprises the devices that are within the same zone or grouping. In simple implementations, each node has symmetric capabilities and/or properties (e.g., peer nodes); in other implementations, different nodes may be different capabilities and/or properties. In some cases, a network may be divided into subnetworks; for example, zones may have subzones. Such network topologies may be useful to support asymmetric node communications. For example, a zone may either include or exclude the subzone, and vice versa. For example, zone nodes within the zone can communicate with other zone nodes and also include subzone nodes (here, subzone nodes may only communicate with one another; i.e., they do not communicate outside the subzone). Alternatively, zone nodes within the zone can communicate with other zone nodes but exclude subzone nodes (in this case, the subzone communicates amongst itself and its zone). Various other subnetwork topology schemes may be substituted with equal success by artisans of ordinary skill in the related arts.

As used herein, the term "peer" and its linguistic derivatives refer to an entity (node, device, system) that uses a symmetric communication protocol with other nodes. While peer nodes typically use a "flat" organization that consists only of peer nodes, peer nodes may also be found in hierarchical schemes at the same level of hierarchy, and/or asymmetric schemes were nodes communicate with a first protocol to its peers and a second protocol to other nodes (e.g., legacy nodes, etc.). In symmetric communication protocols, nodes use the same communication processes; e.g., nodes can request, send, receive, store, and/or forward data, etc. Symmetric communication protocols generally allow any node to join or leave a network. In some peer-to-peer networks, peer nodes may act as both a client and a server. In contrast, asymmetric communication protocols limit specific communication processes to a subset of the nodes. For example, a node might be either client or server, but not both, etc.

During initial discovery, some networks may additionally enumerate and/or negotiate communication parameters. Communication parameters define the rules and settings that govern the communication protocol used to exchange information within the network. Communication parameters establish the operational framework for message formatting, timing, transmission methods, error handling, and routing behavior. In essence, they ensure that all nodes can interpret and respond to messages consistently and reliably. The function of these parameters is critical-they influence everything from the efficiency and reliability of data transmission to how the network responds under stress or fault conditions. Poorly tuned communication parameters can result in delays, collisions, data loss, or excessive energy consumption, while well-configured parameters enhance synchronization, throughput, and resilience.

Communication parameters may be used to optimize for the system for certain design constraints. For example, a network that optimizes for power consumption and cost may minimize communication frequency, often at the expense of performance, etc. In contrast, a network that optimizes for performance may consume more power, etc. So, for example, shorter timeout and/or retransmission parameters to allow for nodes to quiesce (sleep) more quickly, saving power. In contrast, longer timeout and/or retransmission parameters may keep the nodes awake longer, but also ensure faster and/or more reliable data transfers, etc.

In a mesh network that uses "flood" messaging (where messages are propagated broadly to all nodes rather than directed point-to-point) communication parameters control message spread and avoiding redundancy or infinite loops. Examples of communication parameters in such a network include: flood interval (how often a node rebroadcasts a message), time-to-live (TTL) (how many hops a message lives before it is discarded), message ID tracking (to avoid unnecessary processing/rebroadcast), transmission power and other parameters that affect physical range and responsiveness of communications, etc. Tuning these parameters properly ensures efficient dissemination of information while preserving bandwidth and energy-especially in wireless or resource-constrained networks.

More generally, artisans of ordinary skill in the related arts will readily appreciate that a variety of different communication and/or operational behaviors may be configured during network initialization. Network initialization may occur when a network is created between devices. In some implementations, communication and/or operational parameters may be propagated to new members that join the network after initialization. In other implementations, communication and/or operational parameters may be configured according to a default (thus, any new node "fits right in"). Still other implementations, may expose any number of these parameters to a user or a 3rd party service to enable post-deployment adjustment, etc.

At step 904, the device quiesces (sleeps) its communications logic. In one specific embodiment, the devices may quiesce (sleep) after joining/creating the network and/or obtaining relevant communication and/or operational parameters. Quiescent modes refer to various low-activity or idle power states that a circuit or device enters when not actively processing tasks, in order to conserve energy or reduce thermal stress. These modes are especially important in battery-powered, embedded, or low-power systems, where managing power consumption is critical.

Different devices may support a variety of different quiescent modes. For example, an "idle" mode may refer to a state where some, or all, control and/or data path logic is powered on but not actively performing operations. Idle modes can quickly transition into active modes but only provide modest reductions in power consumption. A "standby" mode may e.g., power-off data path and/or some control path logic, but continue to power volatile memories (RAM, etc.). Standby modes can still resume operation quickly (a few milliseconds, seconds, etc.) but may offer significantly better power consumption than idle. "Sleep" modes often power-off all but dedicated low-power logic and volatile memory. The low-power logic is scheduled, periodic, or otherwise triggered at wake events; the low-power logic only initiates wake-up of other processing logic. Typically, sleep modes may allow for very long sleep intervals (e.g., seconds, minutes, etc.). "Deep sleep" modes may provide even longer sleep intervals by writing volatile memory (RAM) to non-volatile memory (Flash, etc.)—deep sleep modes only need to power the low-power logic (milliwatts/microwatts, etc.) and while wake-up may be lengthy, deep sleep can allow for extended periods of inactivity (e.g., hours, days, weeks, etc.).

Within the context of a lighting device, the lighting device may have an "active" mode where its light emitting circuitry is enabled and actively emitting light; network communication may also be active. An "idle" mode may enable the light emitter (at no, or low, light intensity) while waiting for e.g., motion detection, ambient light information, communication, etc. In "standby" mode, most of the lighting logic may be powered-off and the communication logic may be running in a low-power mode; low-power logic may periodically check for motion, ambient light, etc. In "sleep" mode, the low-power logic may schedule wake-up intervals to check for motion/ambient light and/or node communications—otherwise, the logic is powered-down. In "deep sleep" mode, the low-power logic may further extend the wake-up intervals and take the additional step of powering down volatile memories.

At step 906, the communications logic wakes. In the illustrated embodiment of FIG. 9, the wake-up is triggered by changes to an operational parameter (e.g., from step 956 as discussed elsewhere); however, artisans of ordinary skill in the related arts will readily appreciate that the wake-up event may be any number of different events (e.g., scheduled in advance, triggered by communication, environment-triggered, user-triggered, etc.).

In a Bluetooth Low Energy (BLE) Mesh network, the wake-up logic is optimized for power efficiency, especially for battery-operated nodes. Since BLE Mesh relies on a flood-based message relay system, nodes typically operate in a low-power sleep mode and wake up to listen for incoming messages or perform scheduled tasks. Wake-up events can be time-driven (e.g., using low-power timers to wake at fixed intervals), event-driven (triggered by local sensor data or external interrupts), or network-driven (e.g., a "friend" or "relay" node). Upon waking, a node checks for advertising packets or message queues in its cache and determines if action is needed-such as relaying a message, updating its internal state, or sending a response. After processing, the node typically returns to sleep to conserve energy. The overall logic ensures that even in a decentralized and asynchronous mesh topology, nodes remain synchronized enough to support robust communication without requiring all nodes to stay awake simultaneously.

Once awakened, the communications logic may distribute the updated operational parameter to its one or more peer nodes (step 908). For example, as discussed elsewhere, motion is detected at a first device. Responsively, the first device updates an operational parameter that governs the motion detector's detection range (increasing it to maximum) and wakes up its BLE mesh logic to notify a second device of the change to operational parameter. As another such example, motion is detected at a first device. Responsively, the first device updates an operational parameter that governs the ambient light sensor (changing dusk-to-dawn mode) and wakes up its BLE mesh logic to notify a second device of the change to operational parameter.

Notably, the second device may be awoken by its communication logic (the BLE mesh modem) rather than the motion detector. The BLE mesh modem may either be woken using an interrupt, periodic polling, etc. Once the second device receives the updated operational parameter, it modifies its own operation accordingly (e.g., changing motion detector detection range, changing dusk-to-dawn mode, etc.). If the TTL for the message has not expired, the second device will also relay the message to other devices, etc.

While the foregoing discussion of BLE mesh networking is primarily focused on power consumption, other networking technologies may prioritize performance (e.g., responsiveness, robust message delivery, etc.), cost (e.g., unit cost per node device, ongoing operational costs, etc.), and/or other system considerations. Furthermore, while the foregoing discussion is presented in the context of peer nodes, the system may be combined with asymmetric nodes with equal success. For example, BLE mesh communication protocols also define friend nodes and relay nodes to support low-power and extended-range communication.

A "low-power" node is designed to operate with minimal power consumption, making it ideal for battery-operated or energy-constrained applications. The LPN role is part of BLE Mesh's built-in power-saving architecture, enabling such nodes to remain asleep for most of the time while still being active participants in the mesh. LPNs spend the majority of their time in quiescent modes to preserve battery life. In some cases, they may form a friendship with a "friend node" and/or rely on "relay nodes" for messaging.

A "friend" node helps low power nodes (LPNs) by storing messages on their behalf when they are asleep and delivering them when the LPN wakes up and requests them. A friend node maintains messaging queues for its associated LPNs and responds to polling requests from LPNs with stored messages. Because of their connectivity demands, friend nodes may be continuously (or more frequently) powered than LPNs.

Relay nodes are range extenders-they receive BLE mesh messages and forward them to other nodes to extend the network range. Much like friend nodes, relay nodes are usually continuously (or more frequently) powered.

More generally, artisans of ordinary skill in the related arts will readily appreciate that other communications technologies and/or communications logic may be substituted with equal success.

In one embodiment, the non-transitory computer-readable medium includes a second routine 950 that enables parameterized operation. When executed by the control and data subsystem, the routine causes the lighting device to: receive an updated operational parameter, monitor for a trigger event based on an operational parameter, emit light in response to a trigger event, and set the operational parameter to a default setting. In some variants, the device may additionally send an updated operational parameter in response to a trigger event.

At step 952, the control and data subsystem receives updated operational parameters from a peer node (e.g., from step 906 as discussed elsewhere). Operational parameters define the specific settings that control how individual nodes in a network perform their assigned tasks. These parameters govern the behavior, performance, and responsiveness of each node in the context of the overall system. They dictate how a node interprets inputs, executes functions, manages energy, and interacts with its environment or neighboring nodes. Operational parameters influence the efficiency, consistency, and adaptability of node behavior—poorly set parameters can cause nodes to underperform, behave unpredictably, or waste resources, while well-calibrated parameters enable synchronized, effective task execution across the network.

Notably, operational parameters define how a node performs its core functional tasks, such as sensing, actuating, or processing data. They control behavior specific to the node's role in the system—like brightness for a light, sampling rate for a sensor, or movement for a motor. In contrast, communication parameters govern how a node interacts with other nodes, managing aspects of data exchange such as message timing, routing, formats, and transmission rules.

Within the context of a light emitting device, operational parameters might include e.g., duty cycle (the proportion of time the light is active), brightness level (intensity of light output), color temperature or hue (for RGB or tunable white devices), trigger threshold (sensor level required to activate illumination), and Timeout duration (how long the light remains on after activation). Coordinating operational parameters allows each node to balance visibility, power consumption, and responsiveness according to system requirements or environmental conditions As a brief aside, some networks may enumerate and/or negotiate communication parameters during network initialization (discussed elsewhere). In such variants, the nodes may additionally coordinate operational parameters as part of the network initialization process. For example, operational parameters may be propagated to new members that join the network after initialization. In other implementations, operational parameters may be configured according to a default (thus, any new node "fits right in"). Still other implementations, may expose any number of these parameters to a user or a $3^{rd}$ party service to enable post-deployment adjustment, etc.

Figure 9:
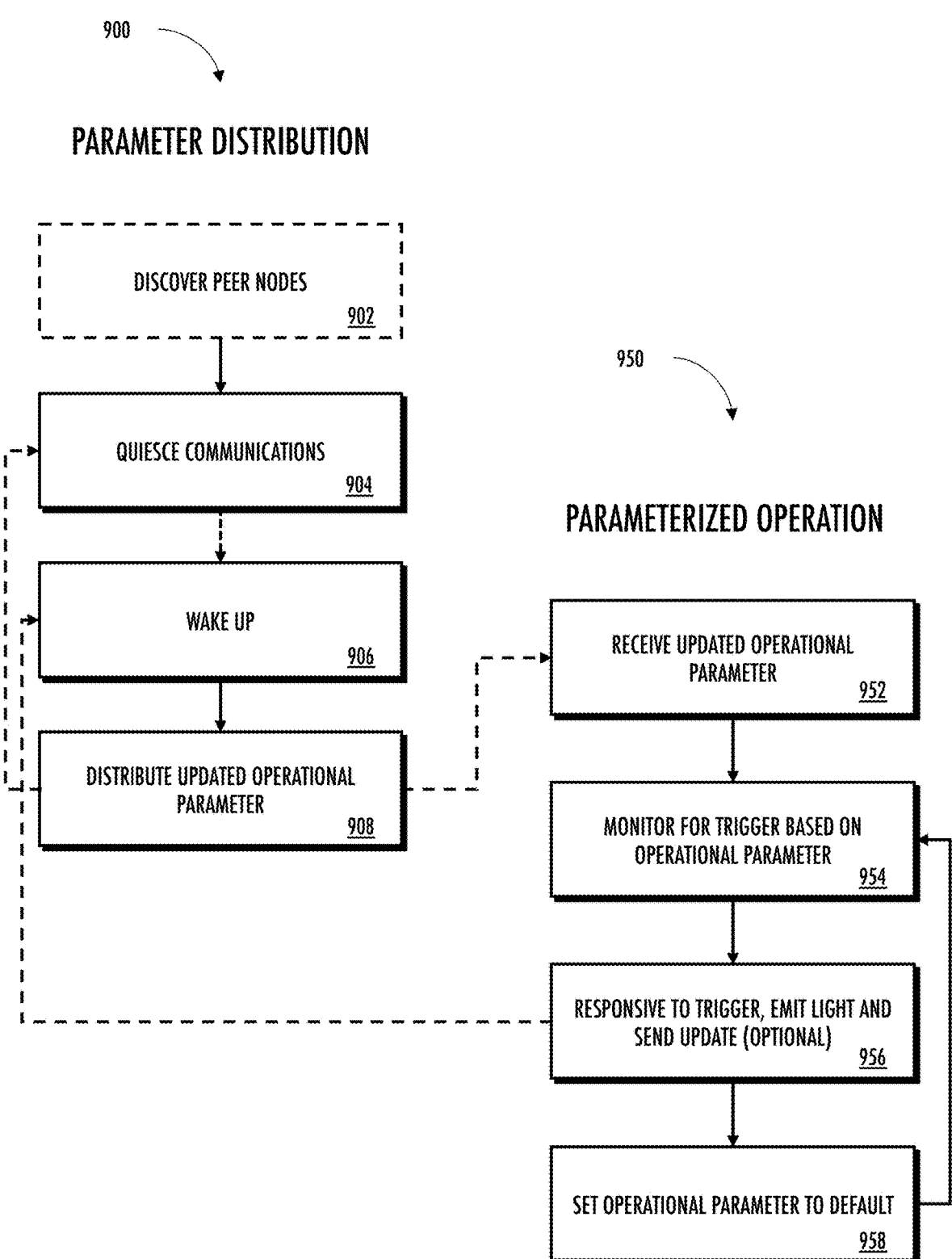
FIG. 9 is a logical flow diagram of parameter distribution and parameterized operation, in accordance with various aspects of the present disclosure.

Referring back to step 952 of FIG. 9, updates to the operational parameter may be received from other nodes via the communications logic. For example, a motion detection node may receive updates to its detection range from nearby peer nodes (similarly, an ambient light detection node may receive updates to its dusk-to-dawn modes, etc.). While the foregoing examples are presented in the context of a mesh network, other forms of dissemination may be substituted with equal success. In other words, a node may periodically poll a server, receive messages from relay/friend nodes, receive push notifications from a server (which trigger polling, etc.). Still other schemes may be substituted with equal success.

In some embodiments, the node may determine whether or not to update an operational parameter. For example, the node may check that the update is authorized and/or authentic (e.g., a node may reject malformed updates and/or updates from unauthorized nodes, etc.). In some cases, a node may verify that an updated operational parameter does not violate its own internal rules. For example, a change to detector range may be ignored if the detection range is already at maximum. As another such example, a change to detector range may be ignored if the detection range is being too frequently changed. As yet another such example, a change to detector range may be ignored if the node has low battery, etc.

In still other embodiments, the node may determine how best to update its own operational parameter. For example, a node may receive a first value for an operational parameter (e.g., maximum motion detector range) and decide to adjust its own operational parameter to a second value based on the first value (e.g., increase motion detector range). In other words, the operational parameter may be updated to a value different than was received. In some such variants, the node may perform selective updates so as to best manage its own resource constraints (e.g., battery power, etc.).

At step 954, the control and data subsystem monitors for a trigger event based on an operational parameter; the control and data subsystem enables the lighting subsystem in response to a trigger event (step 956). More directly, the various aspects of the present disclosure decouple nodes' real-time operation from external influences. In other words, the node's real-time operation refers to its response to inputs or events within a time constraint, ensuring that operations are performed in a timely manner. For example, a motion detecting (or ambient light sensing) lighting system will continue to operate according to its own operational parameters. The node may update its lighting behavior when-received, but it does not rely on centralized management. Moreover, a node that is malfunctioning may not bleed into the operation of other nodes, or more broadly, the system.

As an interesting tangent, the nodes independently manage their own operation yet may (or may not) also coordinate with other nodes. Loose coordination in this manner may result in an emergent behavior for the system. Here, "emergent" behavior refers to complex patterns, properties, or actions that arise from the interaction of components in a system, where the overall behavior is not explicitly programmed or predictable just by analyzing the individual parts. In other words, the whole exhibits characteristics that the parts do not, and these characteristics "emerge" when the components interact within the system.

Emergent behaviors typically arise from local interactions among nodes without a centralized intelligence. For example, rather than using a centralized server to manage lighting nodes of a lighting system (e.g., receiving information from nodes, determining system behavior and instructing individual nodes), the lighting nodes may be "smart enough" to provide substantially equivalent behaviors by coordinating their own simple operations (e.g., detect event, flood response outwards). Emergent systems can be robust, adaptive, and scalable in ways that are more difficult for centralized systems. For example, a centralized server may need to continuously check for nodes that are out-of-date and/or behaving errantly; an emergent system may selfcorrect/compensate without centralized control overhead. While emergent behavior may be interesting, it is neither required nor necessarily desirable.

In some embodiments, the control and data subsystem may additionally send an updated operational parameter in response to a trigger event. In some variants, the updated operational parameter reflects its own operational parameter; alternatively, the updated operational parameter may be the originally received operational parameter. For example, a first node may update its motion detector range to maximum, a second node may update its motion detector range to an increased (but not maximum amount) but send an updated parameter that is either the maximum or its set amount. In this manner, either original operational parameter settings or filtered operational parameter settings may propagate throughout the network.

While the foregoing discussion is presented in the context of operational parameters, artisans of ordinary skill in the related arts will readily appreciate that other information may be substituted with equal success. For example, rather than receiving operational parameters, the node might receive an indication of the trigger event (e.g., motion detected, etc.). In other such examples, the node may receive other types of information; for example, a publish-subscribe type information model might publish a variety of different settings, events, triggers, etc. which may be selectively monitored by the node. This may be useful where different nodes have different capabilities and/or detection modalities. For example, a motion detector node may directly interact with a ambient light node-rather than transacting with operational parameters which may not have direct analogues, they may transact trigger events (e.g., the motion detector senses motion, which the dawn-to-dusk uses to internally modify its own parameters, etc.).

At step 958, the control and data subsystem sets the operational parameter to a default setting. For example, after no motion has been detected, a motion detecting light may return to its default detector distance after 10 minutes. Returning to the default value allows the device to participate in more sensitive motion detection around trigger events, while also conserving power while inactive, etc. In other words, the default operational parameters allows the node to optimize for its own needs (e.g., power, performance, etc.).

A variety of different "return" schemes may be substituted with equal success. As previously noted, the node may return to its default parameter after a set amount of time (e.g., reset after 10 minutes, etc.). In other embodiments, the node may return to its default parameter after a trigger condition (e.g., when motion is no longer detected, etc.). In other embodiments, the node may return to its default parameter after a scheduled event (e.g., reset at end of day, etc.). Still other embodiments may allow a user to manually, or automatically, adjust parameters as-needed.

While the present disclosure describes setting the operational parameter to a default value, artisans of ordinary skill will appreciate that other implementations may e.g., return to a baseline value using incremental steps, remain at an adjusted value until later updated, etc. In other words, other return behaviors may have some behavioral hysteresis. This may be desirable to moderate changes in behavior (e.g., to avoid sudden changes, etc.).

5 Additional Configuration Considerations

Throughout this specification, some embodiments have used the expressions "comprises," "comprising," "includes," "including," "has," "having" or any other variation thereof, all of which are intended to cover a nonexclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the term "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processor" or "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus, comprising:
a motion sensor configured to detect motion based on a first range parameter;
a modem configured to connect to a peer apparatus;
a processor; and
a non-transitory computer-readable medium comprising instructions that, when executed by the processor, cause the apparatus to:
initialize the first range parameter to a first value;
monitor for a motion event at a first range according to the first value; and
responsive to the motion event, update the first range parameter to a second value and transmit the second value for a second range parameter to the peer apparatus via the modem, the second value configured to cause the peer apparatus to detect motion at a second range, where the second range is different than the first range.

2. The apparatus of claim 1, where the apparatus further comprises a lighting module, and where the instructions further cause the apparatus to emit light in response to the motion event for a first duration.

3. The apparatus of claim 2, where the first range parameter is set to the first value after the first duration.

4. The apparatus of claim 1, where the instructions further cause the apparatus to discover the peer apparatus during an initial discovery period.

5. The apparatus of claim 4, where the apparatus initializes the first range parameter to the first value during the initial discovery period and the peer apparatus initializes the second range parameter to the first value during the initial discovery period.

6. The apparatus of claim 5, where the modem is configured to quiesce communications after the initial discovery period, and where the instructions further cause the apparatus to wake the modem in response to the motion event.

7. An apparatus, comprising:
a motion detector;
a modem configured to connect to a peer apparatus;
a first ambient light sensor configured to operate in a plurality of modes based on a first dusk-to-dawn parameter;
a processor; and
a non-transitory computer-readable medium comprising instructions that, when executed by the processor, cause the apparatus to:
discover the peer apparatus during an initial discovery period and quiesce communications after the initial discovery period;
initialize the first dusk-to-dawn parameter to a first value that selects a first mode for the first ambient light sensor;
monitor for a motion event via the motion detector; and
responsive to the motion event, wake the modem and transmit a second value for a second dusk-to-dawn parameter to the peer apparatus via the modem, the second value configured to cause the peer apparatus to operate a second ambient light sensor in a second mode different than the first mode.

8. The apparatus of claim 7, where the instructions further cause the apparatus to update the first dusk-to-dawn parameter to the second value in response to the motion event.

9. The apparatus of claim 8, where the apparatus further comprises a lighting module, and where the instructions further cause the apparatus to emit light based on a sensed ambient light exceeding a threshold value corresponding to the first dusk-to-dawn parameter.

10. The apparatus of claim 7, where the apparatus initializes the first dusk-to-dawn parameter to the first value during the initial discovery period and the peer apparatus initializes the second dusk-to-dawn parameter to the first value during the initial discovery period.

11. A system of apparatus, comprising:

at least a first apparatus having a first wake-up timing and a second apparatus having a second wake-up timing configured to communicate according to a peer-to-peer protocol; and where the first apparatus is configured to change a first value of a first operational parameter of the second apparatus, in response to a trigger event.

12. The system of claim 11, where the system further comprises a third apparatus configured to communicate with the second apparatus according to the peer-to-peer protocol.

13. The system of claim 12, where the second apparatus is configured to set a second value of a second operational parameter of the third apparatus, in response to a change of the first value of the first operational parameter.

14. The system of claim 13, where the second apparatus performs motion detection based on the first operational parameter and the third apparatus performs motion detection based on the second operational parameter.

15. The system of claim 13, where the second apparatus performs ambient light detection based on the first operational parameter and the third apparatus performs ambient light detection based on the second operational parameter.

16. The system of claim 13, where the second apparatus performs motion detection based on the first operational parameter and the third apparatus performs ambient light detection based on the second operational parameter.

17. The system of claim 13, where the first apparatus, the second apparatus, and the third apparatus each comprise a lighting module.

* * * * *